RANDOM ACCESS STORAGE AND DELIVERY DEVICE

Filed Sept. 26, 1961 12 Sheets-Sheet 1

INVENTORS
MARC BENDICK
VINCENT J. GALATI
DONALD B. MANNING
BY Bulwinkle Mattingly & Huntley
ATTORNEYS March 29, 1966 M. BENDICK ETAL 3,243,780

RANDOM ACCESS STORAGE AND DELIVERY DEVICE

Filed Sept. 26, 1961 12 Sheets-Sheet 2

INVENTORS
MARC BENDICK
VINCENT J. GALATI
DONALD B. MANNING
BY Fulwider Mattingly & Huntley
ATTORNEYS

RANDOM ACCESS STORAGE AND DELIVERY DEVICE

Filed Sept. 26, 1961 12 Sheets-Sheet 3

INVENTORS
MARC BENDICK
VINCENT J. GALATI
DONALD B. MANNING
BY Zuluvider Mattingly & Huntley
ATTORNEYS Fig. 6
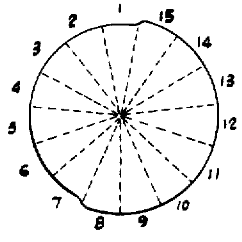
CAM A
Fig. 7
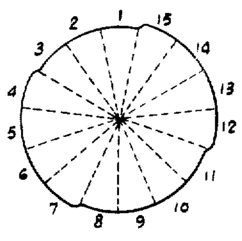
CAM B
Fig. 8
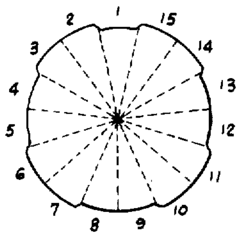
CAM C
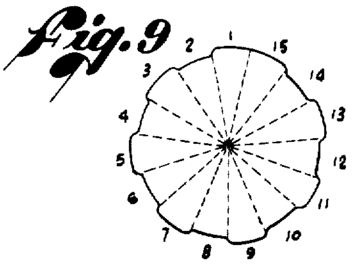 Fig. 9
CAM D
Fig. 10
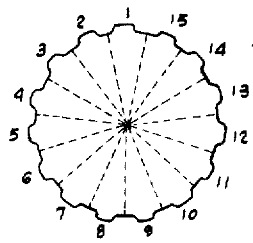
CAM E
Fig. 12
| POSITION NO. | CAM NO. | | | | |
|---|---|---|---|---|---|
| | A | B | C | D | E |
| 1 | O | O | O | 1 | 1 |
| 2 | O | O | 1 | O | 1 |
| 3 | O | O | 1 | 1 | 1 |
| 4 | O | 1 | O | O | 1 |
| 5 | O | 1 | O | 1 | 1 |
| 6 | O | 1 | 1 | O | 1 |
| 7 | O | 1 | 1 | 1 | 1 |
| 8 | 1 | O | O | O | 1 |
| 9 | 1 | O | O | 1 | 1 |
| 10 | 1 | O | 1 | O | 1 |
| 11 | 1 | O | 1 | 1 | 1 |
| 12 | 1 | 1 | O | O | 1 |
| 13 | 1 | 1 | O | 1 | 1 |
| 14 | 1 | 1 | 1 | O | 1 |
| 15 | 1 | 1 | 1 | 1 | 1 |
Fig. 11
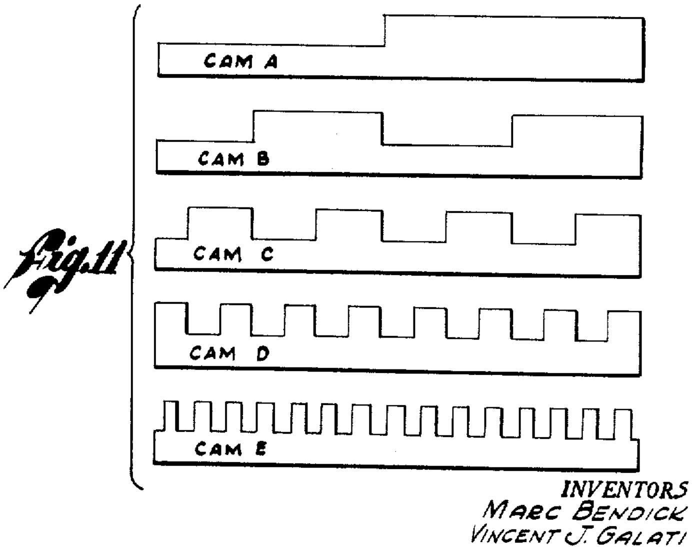
INVENTORS
MARC BENDICK
VINCENT J. GALATI
DONALD B. MANNING
BY Fulwider Mattingly & Huntley
ATTORNEYS

RANDOM ACCESS STORAGE AND DELIVERY DEVICE

INVENTORS
MARC BENDICK
VINCENT J. GALATI
DONALD B. MANNING
BY Dulwider Mattingly & Huntley
ATTORNEYS INVENTORS
MARC BENDICK
VINCENT J. GALATI
DONALD B. MANNING
By Fulwider Mattingly & Huntley
ATTORNEYS REV. # 1
| POSITION | CAM NO. F | G | H | I | J | K | L |
|---|---|---|---|---|---|---|---|
| 1 | 0 | 0 | 0 | 0 | 0 | 0 | 1 |
| 2 | 1 | 0 | 0 | 0 | 0 | 0 | 1 |
| 3 | 0 | 1 | 0 | 0 | 0 | 0 | 1 |
| 4 | 1 | 1 | 0 | 0 | 0 | 0 | 1 |
| 5 | 0 | 0 | 1 | 0 | 0 | 0 | 1 |
| 6 | 1 | 0 | 1 | 0 | 0 | 0 | 1 |
| 7 | 0 | 1 | 1 | 0 | 0 | 0 | 1 |
| 8 | 1 | 1 | 1 | 0 | 0 | 0 | 1 |
| 9 | 0 | 0 | 0 | 1 | 0 | 0 | 1 |
| 10 | 1 | 0 | 0 | 1 | 0 | 0 | 1 |
Fig. 21
REV. #2
| POSITION | CAM NO. F | G | H | I | J | K | L |
|---|---|---|---|---|---|---|---|
| 11 | 0 | 0 | 0 | 0 | 1 | 0 | 1 |
| 12 | 1 | 0 | 0 | 0 | 1 | 0 | 1 |
| 13 | 0 | 1 | 0 | 0 | 1 | 0 | 1 |
| 14 | 1 | 1 | 0 | 0 | 1 | 0 | 1 |
| 15 | 0 | 0 | 1 | 0 | 1 | 0 | 1 |
| 16 | 1 | 0 | 1 | 0 | 1 | 0 | 1 |
| 17 | 0 | 1 | 1 | 0 | 1 | 0 | 1 |
| 18 | 1 | 1 | 1 | 0 | 1 | 0 | 1 |
| 19 | 0 | 0 | 0 | 1 | 1 | 0 | 1 |
| 20 | 1 | 0 | 0 | 1 | 1 | 0 | 1 |
Fig. 22
REV. #3
| POSITION | CAM NO. F | G | H | I | J | K | L |
|---|---|---|---|---|---|---|---|
| 21 | 0 | 0 | 0 | 0 | 0 | 1 | 1 |
| 22 | 1 | 0 | 0 | 0 | 0 | 1 | 1 |
| 23 | 0 | 1 | 0 | 0 | 0 | 1 | 1 |
| 24 | 1 | 1 | 0 | 0 | 0 | 1 | 1 |
| 25 | 0 | 0 | 1 | 0 | 0 | 1 | 1 |
| 26 | 1 | 0 | 1 | 0 | 0 | 1 | 1 |
| 27 | 0 | 1 | 1 | 0 | 0 | 1 | 1 |
| 28 | 1 | 1 | 1 | 0 | 0 | 1 | 1 |
| 29 | 0 | 0 | 0 | 1 | 0 | 1 | 1 |
| 30 | 1 | 0 | 0 | 1 | 0 | 1 | 1 |
Fig. 23
REV. #4
| POSITION | CAM NO F | G | H | I | J | K | L |
|---|---|---|---|---|---|---|---|
| 31 | 0 | 0 | 0 | 0 | 1 | 1 | 1 |
| 32 | 1 | 0 | 0 | 0 | 1 | 1 | 1 |
| 33 | 0 | 1 | 0 | 0 | 1 | 1 | 1 |
| 34 | 1 | 1 | 0 | 0 | 1 | 1 | 1 |
| 35 | 0 | 0 | 1 | 0 | 1 | 1 | 1 |
| 36 | 1 | 0 | 1 | 0 | 1 | 1 | 1 |
| 37 | 0 | 1 | 1 | 0 | 1 | 1 | 1 |
| 38 | 1 | 1 | 1 | 0 | 1 | 1 | 1 |
| 39 | 0 | 0 | 0 | 1 | 1 | 1 | 1 |
| 40 | 1 | 0 | 0 | 1 | 1 | 1 | 1 |
Fig. 24
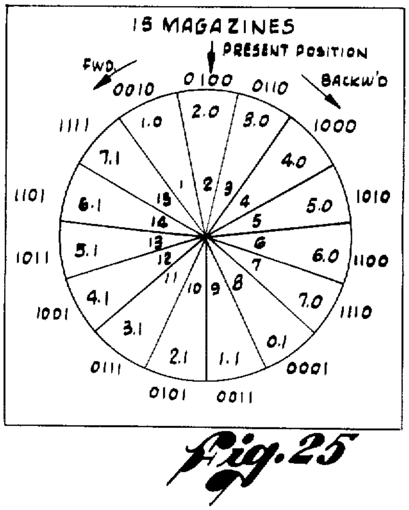
Fig. 25
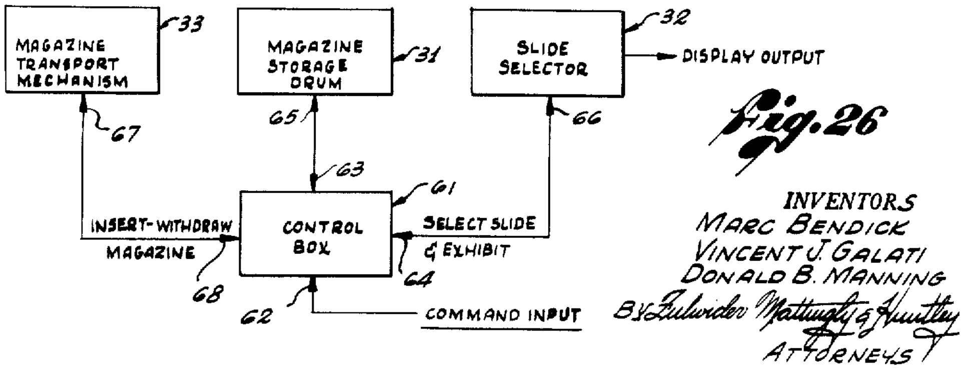
Fig. 26
INVENTORS
MARC BENDICK
VINCENT J. GALATI
DONALD B. MANNING
BY Zulwider Mattingly & Huntley
ATTORNEYS

RANDOM ACCESS STORAGE AND DELIVERY DEVICE

INVENTORS
MARC BENDICK
VINCENT J. GALATI
DONALD B. MANNING
BY Zulwider Mattingly & Huntley
ATTORNEYS INVENTORS
MARC BENDICK
VINCENT J. GALATI
DONALD B. MANNING
By Bulwinkle Mattingly & Huntley
ATTORNEYS INVENTORS
MARC BENDICK
VINCENT J. GALATI
DONALD B. MANNING
BY Zulwider Mattingly & Huntley
ATTORNEYS INVENTORS
MARK BENDICK
VINCENT J. GALATI
DONALD B. MANNING
BY Zulwider Mattingly & Huntley
ATTORNEYS March 29, 1966 M. BENDICK ETAL 3,243,780

RANDOM ACCESS STORAGE AND DELIVERY DEVICE

Filed Sept. 26, 1961 12 Sheets-Sheet 12

INVENTORS
MARC BENDICK
VINCENT J. GALATI
DONALD B. MANNING
BY Dulwider, Mattingly & Huntley
ATTORNEYS United States Patent Office 3,243,780

Patented Mar. 29, 1966

3,243,780

RANDOM ACCESS STORAGE AND DELIVERY DEVICE

Marc Bendick, Pacific Palisades, Vincent J. Galati, Granada Hills, and Donald B. Manning, Manhattan Beach, Calif., assignors to System Development Corporation, Santa Monica, Calif., a corporation of California Filed Sept. 26, 1961, Ser. No. 140,749
14 Claims. (Cl. 340—172.5)

The present invention relates to a storage and delivery device in which a plurality of items are stored in identified positions, which provides for the recall of any one of the items into a delivery position upon command.

For the purpose of exemplification only, the present invention is illustrated and described in connection with the storage of information in the form of visual slides whose content is projected upon a viewing screen and in which any one of a plurality of slides may be recalled upon command for delivery to an optical projector for projection of the slide information onto a viewing screen. It will be understood that the present invention is applicable to the storage and recall (delivery) of any desired items, such as cards, tapes, keys, etc., which it is desired to recall without regard to the position of the particular item in a series of such items.

In the storage of items for recall at random, that is without regard to the position of the item with relation to other items and independently of such other items, it is desirable to secure the recall and delivery of the selected item in a minimum of time, since even small increments of time, considered with respect to the recall and delivery of a single item, will, in the recall of a number of items, total a significant time elapse in an over-all operating period. Since the device will ordinarily require moving parts which must physically transfer from a "present position" from the last delivery and/or storage operation to an "address position" identified with the particular item recalled, it is desirable that this physical motion be accomplished in a direction providing for a minimum of travel distance and travel time. This manner of operation becomes particularly important where at least a portion of the storage and of the physical motion is in a continuous circular path, so that the address position may be reached by motion in either of two opposite directions. One of the features of the device according to the present invention is that it senses which direction of motion provides the shorter path from the present position to the desired position, and effects movement in the direction of the shorter path to secure a minimum recall and delivery time.

In the exemplified form of the present invention, the individual items, specifically identified as projector slides, are mounted in identified address positions in magazines in rectilinear fashion, and the magazines stored in identified address positions in a rotating drum which presents the magazines into a delivery position in accordance with recall command. The recalled magazine is removed from the drum into a delivery position from which it can be moved so that the selected slide may be moved to its delivery station. To effect this selection and recall, address information as to the position of the slide within the magazine and the position of the magazine within the drum for the slide selected for recall is fed to a logic circuit and this desired address is there compared with the present address of the device in terms of the last delivered magazine and slide. The comparison circuits furnish the signals required to effect the desired movement of the parts to move the selected slide into delivery position in the shortest time.

The information as to present address of the magazine and slide at the delivery position and the desired address of the slide and the magazine to be recalled may be effected by various sensing systems and the comparison and motion selection made by means consistent with the system selected for identifying the present and desired addresses of the parts. For specific exemplification of this invention in the drawings and in the description thereof, it has been selected that the present position address be indicated by cam-operated electric switches, and that the desired position address be transmitted to the device by electrical switching circuits operating in response to activation by computers, cards, tapes, or by manual insertion of the desired address information.

It will be understood that the designations "present address" and "desired address" are used herein primarily to identify the magazine and slide *presently* in the delivery position and the magazine slide *desired* to be placed in the delivery position for recall of that slide. In other words, the addresses are in or are moved into the delivery position, not the delivery position to the address.

While the information of present and desired addresses may be introduced into the device in many forms, the exemplification primarily uses binary coded information supplied as bits by the "on" and "off" positions of electric switches identified with successive powers of the binary system. In addition, the magazine storage drum uses additional bits to identify the half of the drum in which the present and desired addresses are located.

The slide identification information is in binary coded decimal form in which four bits are coded in binary according to position of the slide in a decimal group and two bits are separately binary coded to indicate the decimal group in which the slide is located. In addition, each of the magazine and slide identification systems utilizes a "clock" bit from an electric switch operated by a cam having twice as many nodes as the least significant bit cam, to provide pulses and avoid address ambiguity as the cam-operated switches are changing state.

In the specific exemplification shown in the drawings and described in the specification, the magazine storage drum has fifteen peripheral containers, each holding a slide magazine, identified by three binary coded information bits and one bit indicating the half of the drum in which the magazine is located. Each magazine contains forty slides identified by six information bits in which two bits indicate in which of the four groups of tens the slide is located, and the other four bits are binary coded to indicate the position of the slide within the group of ten in which it is located.

In the operation of the device, a difference between a present address and a desired address in an "unequal to" condition which causes a "go" signal to be gated through a logic circuit to rotate the magazine storage drum into the desired address position in which an "equal to" condition exists for the drum addresses. Thereafter, the magazine is moved to the slide position to which it has been addressed until an "equal to" condition exists with respect to the slide addresses, whereupon the slide is moved out of the magazine into its projector position. The logic which determines the direction of shortest movement for magazines and slide searches will be described more fully hereinafter in the detailed description of the selected exemplification of the invention.

An object of the present invention is the provision of an improved random access storage device.

Another object of this invention is the provision of an improved storage and delivery device providing for random recall of stored items.

Another object of this invention is the provision of an improved storage and delivery device giving random access to a selected item and effecting delivery of the selected item in a minimum of time.

A further object of this invention is the provision of an improved storage device for individual items in which selection and delivery of a recalled item is effected with the shortest positional movement.

A still further object of this invention is the provision of an improved storage and delivery device for a plurality of items in which the positional address of an item selected for recall is compared in a logic circuit to the present positional address of the device to secure a signal directing the device to move the selected item into delivery position in the shortest path of movement.

These and other objects and features of the invention will be readily apparent to those skilled in the art from the following specification and the appended drawings, in which:

FIGURE 6 is a schematic representation of the present address "half cam" for the magazine, labeled "Cam A";

FIGURE 7 is a schematic representation of the most significant address cam for the magazine, supplying bit information corresponding to $2^2$ in the binary coding and designated "Cam B";

FIGURE 8 is a schematic representation of the next significant magazine address cam, supplying bit information corresponding to $2^1$ in the binary coding and designated "Cam C";

FIGURE 9 is a schematic representation of the least significant magazine address cam, supplying bit information corresponding to $2^\circ$ in the binary coding and designated "Cam D";

FIGURE 10 is a schematic representation of the magazine clock cam, designated "Cam E";

FIGURE 11 is a schematic representation of the developed cam surfaces of Cams A through E;

FIGURE 12 is a code chart showing switching positions effected by the cams in the various drum or magazine positions, the "0" symbol indicating switch in normal position and the unit "1" indicating switch in operated position;

FIGURE 21 is a code chart showing the switching operations of Cams F through L for the first ten slide positions, corresponding to one revolution of Cams F through I and L and a quarter revolution of Cams J and K;

FIGURE 22 is a code chart of switch operation in the second revolution of Cams F through I and L;

FIGURE 23 is a code chart for switch operation in the third revolution of Cams F through I and L;

FIGURE 24 is a code chart of the switch operation for the fourth revolution of Cams F through I and L;

FIGURE 25 is a schematic representation of various designations of the fifteen magazine container positions on the rotating storage drum;

FIGURE 26 is a block diagram illustrating the operation of the storage and delivery device of this invention;

Figure 1:
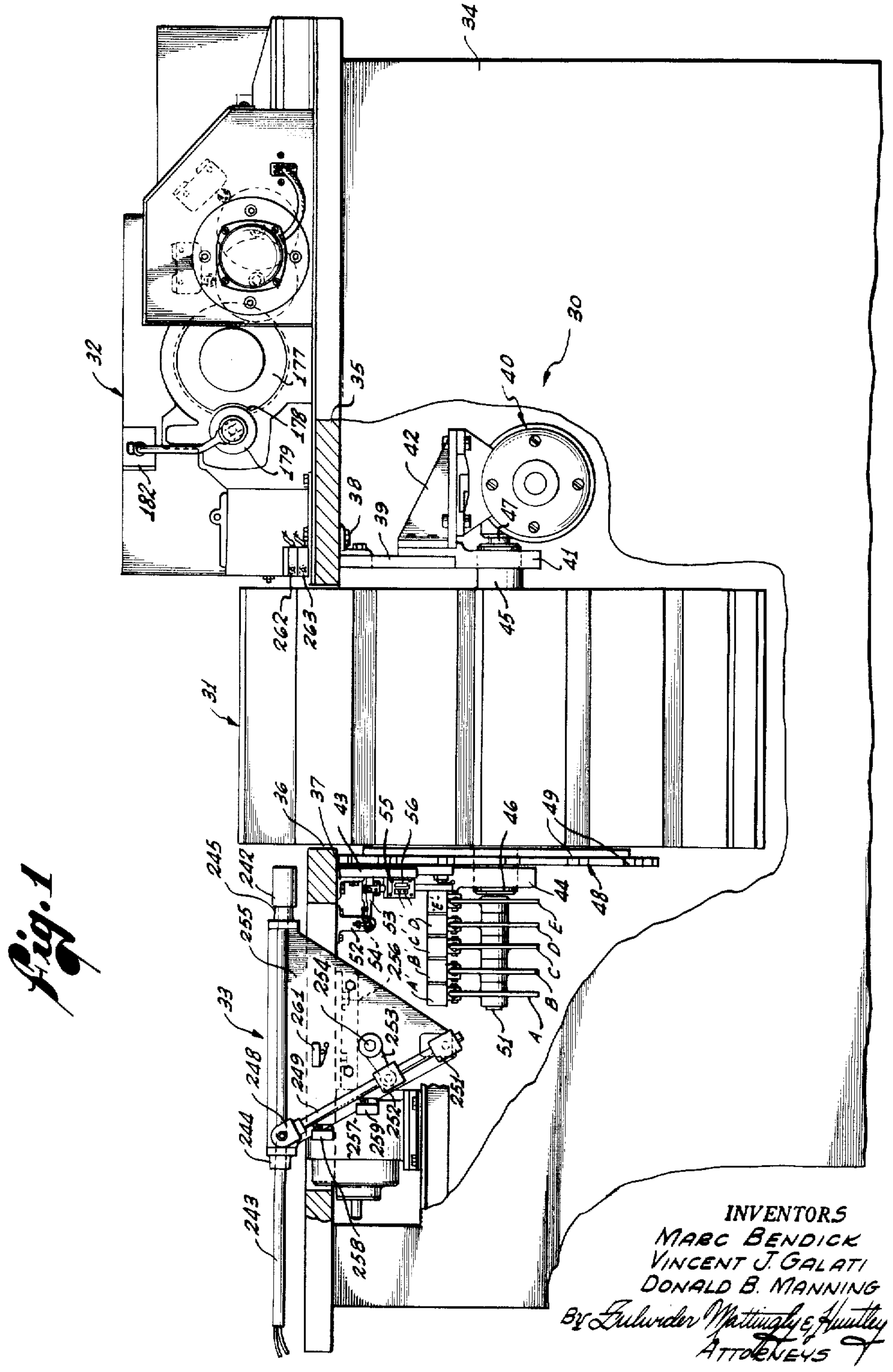
FIGURE 1 is a side elevational view, partially broken away, of a random access storage and delivery device according to the present invention.
Figure 2:
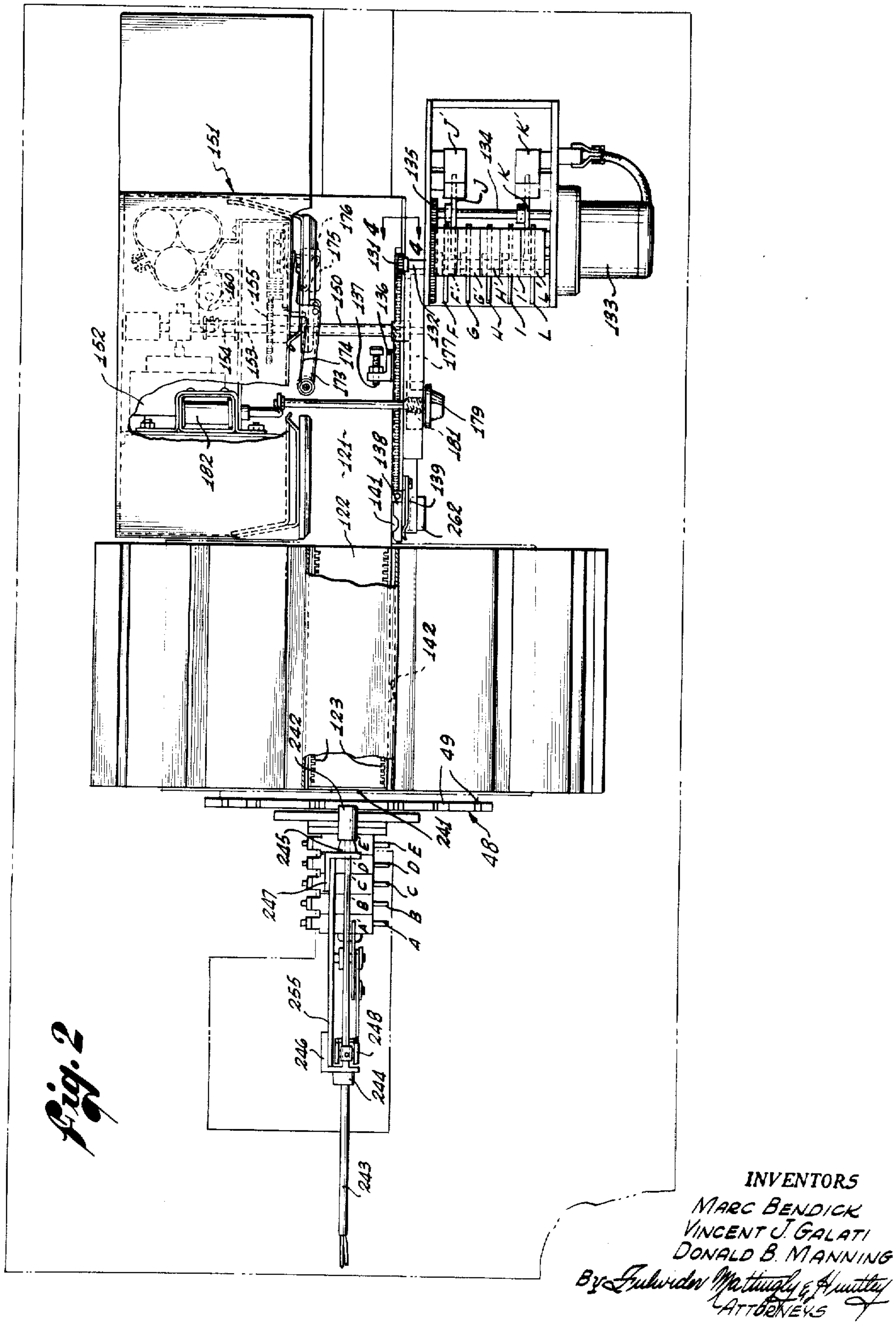
FIGURE 2 is a plan view, partially broken away, of the device of FIGURE 1.

Referring first to FIGURE 26, there is shown a block diagram which summarizes the functions and communication paths of the major elements of the random access storage and delivery device and of the control box housing the magazine and slide logic comparison circuits. The magazine storage drum is shown at 31, the slide selector at 32, and a magazine transport mechanism for moving the magazine from the storage drum 31 into the slide selector 32 is designated 33. The control box containing the logic comparison circuits is designated 61. The command input represents the bit information which constitutes the positional address of the slide to be selected for display, including the identification of the magazine in which the slide is contained and the position of the selected slide within the magazine. This command input, the desired address communication, is indicated by the arrow 62. The present address of the magazine storage drum is communicated to the control box 61 as information bits derived from the positions of the switches operated by the Cams A through D, as represented by the arrow 63. The address of the slide at the delivery station is communicated to the control box 61 by the positions of the switches operated by Cams F through K, as indicated by the arrow 64. The control box 61 sends an operational signal to the magazine storage drum 31 to rotate the desired magazine container to the top of the drum, as indicated by the arrow 65; sends an operational signal to the slide selector 32 to position the magazine with the desired slide located at the delivery station, as indicated by the arrow 66; and sends an operational signal to the magazine transport mechanism 33, as indicated by the arrow 67, to effect movement of the magazine between the storage drum 31 and the slide selector 32. Further, the magazine transport mechanism communicates its present position to the control box, as indicated by the arrow 68.

Turning now to FIGURES 1 through 5, the random access storage and delivery device according to the present invention has been indicated generally by the numeral 30, and includes the magazine storage drum 31, the slide selector 32, and the magazine transport mechanism 33. The components 31–33 are mounted within or upon a bench or table 34 having a top platform 35. A large transverse slot 36 extends through the platform 35, and through the slot 36 extends the upper part of the magazine storage drum 31 so as to expose the uppermost magazine container above the upper surface of the platform 35.

*The magazine storage drum*

A pair of angle brackets 37 and 38 are supported beneath the platform 35 adjacent to the rear and forward edges of the slot 36. A supporting plate 39 is mounted on the angle 38, and a bearing plate 41 and a supporting bracket 42 are mounted upon the supporting plate 39. A supporting plate 43 is mounted on the bracket 37, and in turn supports a bearing plate 44. The bearing plates 41 and 44 have openings therethrough within which are rotatably mounted the trunnions 45 and 46, respectively, which carry the magazine storage drum. Depending from the bracket 42 is a driving motor 40 connected to the trunnion 45 through a gear box 50 and a shaft 47.

Rigidly mounted on the trunnion 46 is an index wheel 48 having a plurality of notches 49 about its periphery corresponding in number to the number of magazine containers about the periphery of the drum and serving to index the containers in magazine delivery and retrieval position. Upon the underside of the platform 35 adjacent the angle 37 is mounted a bracket 52, having pivotally mounted on its end an arm 53 biased by a spring 54 in a counterclockwise direction. The free end of the arm 53 is received within the notches 49 in the periphery of the wheel 48 to index the magazine storage drum in position and is moved into notch-engaging indexing position by a solenoid 55. The spring 54 moves the arm 53 out of the slot 49 when the solenoid 55 is de-energized so as to permit rotation of the magazine storage drum. A switch 56 is also operated by the solenoid 55.

Figure 3:
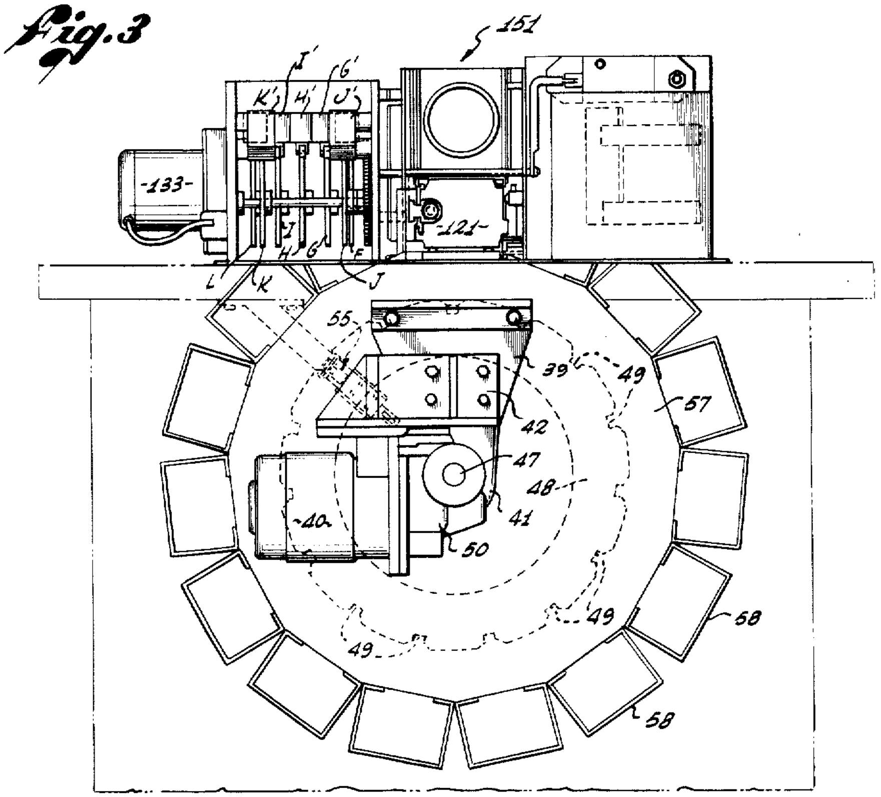
FIGURE 3 is a front elevational view of the device taken from the right-hand side of FIGURE 1.
Figure 4:
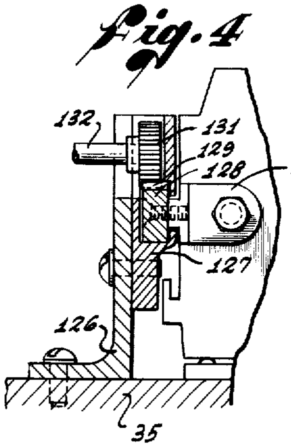
FIGURE 4 is an enlarged detail sectional view on the line 4—4 of FIGURE 2.
Figure 5:
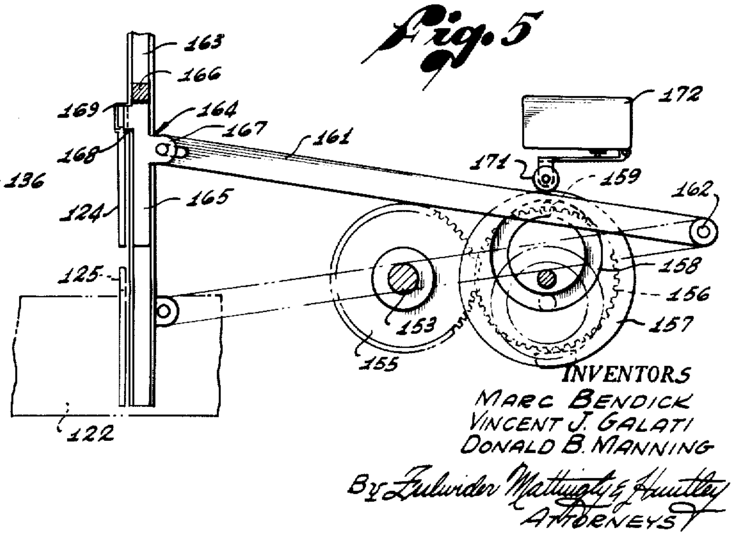
FIGURE 5 is an enlarged detail view of the mechanism for removing a slide from the magazine.
Figure 16:
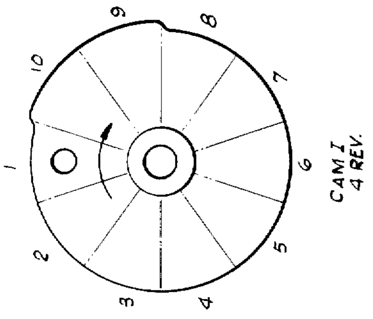
FIGURE 16 is a schematic representation of the most significant cam supplying bit information for present slide position in straight binary coding, corresponding to $2^3$ in the binary series, and designated "Cam I"
Figure 15:
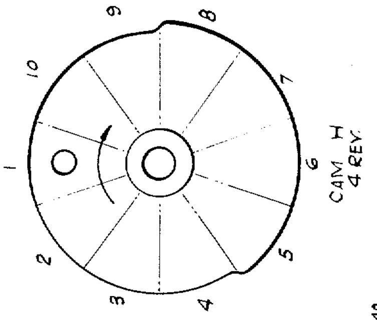
FIGURE 15 is a schematic representation of a cam operating a switch in the slide logic comparison circuit, corresponding to $2^2$ in the binary coding and designated "Cam H"

The drum proper is shown at 57 in FIGURE 3, and has mounted about its periphery a plurality of axially extending containers 58, rectangular in cross section, and serving to support the slide magazines therein. The drum proper 57 is rigidly mounted on the trunnions 45 and 46. As specifically illustrated in the drawing, fifteen magazine containers 58 are shown about the periphery of the drum 57, but it will be understood that any desired number may be utilized for item storage and of either even or odd number. The magazine containers 58 are open at both ends to permit insertion of a magazine transfer at their rear ends, and removal and retrieval of the magazines through their forward ends.

Rigidly secured to the trunnion 46 is a shaft 51 upon which are rigidly mounted the five cams, A, B, C, D and E, having cam surfaces on their peripheral edges cooperating with follower operators for the electric switches A′, B′, C′, D′ and E′. Switches A′, B′, C′ and D′ are of the single pole, double throw type. Switch E′ is of the single pole, single throw type.

Schematic side elevational views of the cams A through E are shown in FIGURES 6 through 10, respectively. Longitudinal developments of cams A through E are shown in FIGURE 11, while a code chart of switch normal and operated positions for the various cams in the different positions of the magazine storage drum is shown in FIGURE 12. Cam A, FIGURE 6, is the half cam, giving bit information identifying the half of the drum in which the magazine positioned at the top is located. The term "half" is loosely used here, since the specific embodiment of the invention selected for illustration has an uneven number (fifteen) of magazine containers about the periphery of the drum. Therefore there are seven magazine containers corresponding to the valley portion of the half cam, while there are eight magazine container positions for the lobe portion of cam A.

Cam B, FIGURE 7, is the most significant cam in the bit information of the binary code, corresponding to the $2^2$ position, and employs lobes and valleys in its periphery as shown in FIGURE 7 and in the second development from the top of FIGURE 11. Cam C is the next significant cam, corresponding to the $2^1$ position in the binary code, and is shown in FIGURE 8 and in the middle development of FIGURE 11. Cam D, in FIGURE 9, is the least significant cam supplying bit information in the binary code, corresponding to the $2^0$ position, and its development is second from the bottom in FIGURE 11.

Cam E, shown in FIGURE 10 and, as developed at the bottom of FIGURE 11, is the clock pulse cam, having peripheral lobes equal in number to the number of the magazine containers (fifteen), and functions to avoid ambiguity in the circuit at the time of present address switch changeover so that it removes the necessity for fine alignment of the informational cams by cooperating with the pulse latching relay to prevent circuit ambiguity.

In the chart of FIGURE 12, the zeros (0) indicate normal switch position and the units (1) indicate switch operated position. Therefore, switches A′, B′, C′ and D′ are supplying bit information as to the present position of the magazine storage drum in accordance with their operated or normal positions determined by the lobes and valleys on the cams.

The identification of the various magazine containers 58 about the drum 57 is indicated in FIGURE 25, wherein magazine containers 1 through 7 are identified by numerals 1.0 to 7.0, while magazine containers 8 through 15 are designated by numerals 0.1 to 7.1. The whole numbers 1 to 7 in each half of the drum are in binary coding from bit information as indicated outside the periphery of the wheel shown in FIGURE 25. The decimal portions .0 and .1 are half-bit information supplied, for present position, by the switch actuated by the cam A. Thus, bit information "101," transmitted by operated, normal, operated switch positions, indicates numeral 5, which can be magazine container either 5 or 13. The additional half location bit information, normal or operated switch, will identify the magazine container specifically; thus .0 (normal switch position) indicates the half in which the magazine container 5 is located. The relation of the fifteen magazine container positions to the binary coded information bits and the half bit information is schematically shown in FIGURE 25 where container 2 is in the "present" or uppermost position for the delivery or retrieval of the magazine stored therein. Cams B, C and D are positioned with respect to their followers so that switches B′, C′ and D′ are in normal, operated and normal positions, respectively, as shown in the code chart of FIGURE 12. Cam A is in position to leave switch A′ in normal position. Therefore the complete bit information for the uppermost container is 0100 which identifies container 2.

*The magazine storage drum comparison circuit*

Figure 27:
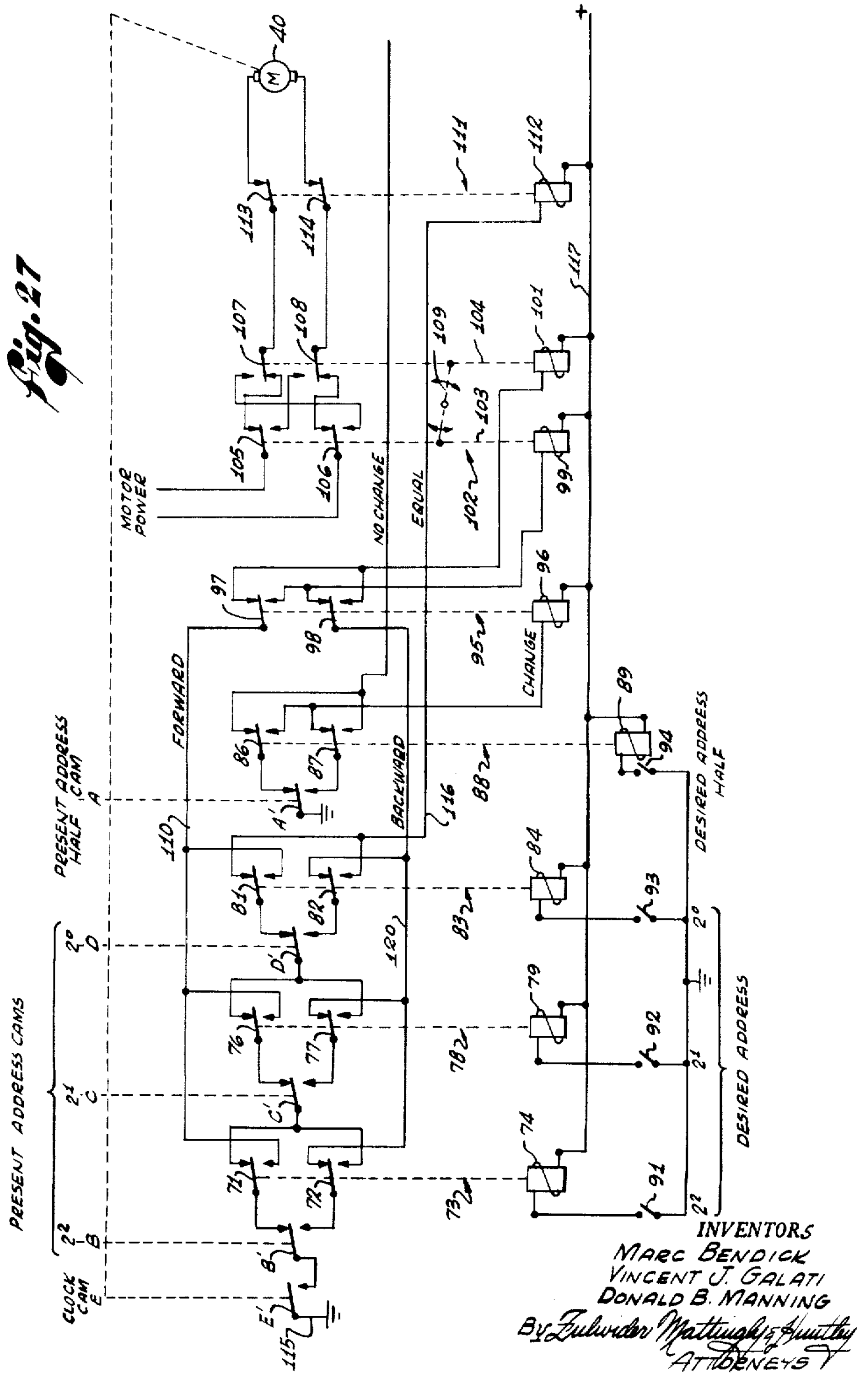
FIGURE 27 is a simplified schematic wiring diagram of the magazine logic comparison circuits for the device.

A simplified wiring diagram for the magazine storage drum comparison circuit is shown in FIGURE 27. The operation of this comparison circuit is to subtract the present position index number from the desired position index number and if the answer is positive, energize the drum driving motor to go forward; and if negative, to go back; and if zero, to stop. The forward and back directions are indicated in the diagram of FIGURE 25, forward being counterclockwise to index higher numbered containers in present position. The above convention holds if the containers are located on the same half of the drum. However, with the rotary storage drum it is apparent that the above convention fails if the present and desired addresses are on different halves of the drum. The information bits as to present and desired half locations are utilized to operate a changeover relay when the addresses are on different halves, this relay operating to reverse the sense of the signal to effect opposite directional rotation from that indicated by the simple subtraction logic. When the present address and the desired address are equal the drum is stopped.

Switches A′ through E′, previously identified, are shown in the diagram of FIGURE 27. The position of cam-operated switch B′ is compared with the positions of the movable contacts 71 and 72 on a relay 73 having an operating coil 74. The position of cam-operated switch C′ is compared with the positions of the movable contacts 76 and 77 of relay 78 having an operating coil 79. The position of cam-operated switch D' is compared with the positions of the movable contacts 81 and 82 of relay 83 having an operating coil 84. The position of the drum half location cam-operated switch A' is compared with the positions of movable contacts 86 and 87 of relay 88 having an operating coil 89. The relay operating coils 74, 79, 84 and 89 are controlled by computers, cards, tapes or manual operators which determine the selection of the slide desired for projection and display. Schematically this control has been illustrated in FIGURE 27 by simple switches 91–94, respectively.

A change-over relay 95, having an operating coil 96, has movable contacts 97 and 98 controlling the energization of the operating coils 99 and 101 of a reversing, latching relay indicated generally at 102 and having a pair of operators 103 and 104 controlling movable contacts 105, 106 and 107, 108, respectively. The operators 103 and 104 are mechanically interlocked at 109. A start-stop relay 111 has an operating coil 112 controlling the position of movable contacts 113 and 114 in the energizing circuit for the motor 40 which drives the magazine storage drum.

In the wiring diagram of FIGURE 27, the positions of the switches A' through D' will be determined by the identity of the magazine container at the top of the drum and will supply the present address bit information. The desired address bit information is placed on the switches 91 through 94 to effect operation of the associated relays 73, 78, 83 and 88, respectively. Upon the transmittal of the desired address bit information, the first comparison made is the address half information comparing the position of switch A' with the positions of the movable contacts 86 and 87. If this comparison indicates that the present address and the desired address are on the same half of the drum then no circuit is completed to the operating coil 96 of relay 95 and the directional signal delivered by the main address comparison circuits and derived from the algebraic subtraction of present address number from desired address number is carried out in the sense given. If this initial comparison shows that the present address and the desired address are on different halves of the drum, then a circuit is completed energizing operating coil 96 to move the contacts 97 and 98 and reverse the sense of the directional signal supplied by the main address comparison circuits.

The next comparison made by the logic circuits is for the most significant bit in the binary coded address number by comparison of the position of switch B' with the positions of the movable contacts 71, 72. If equality exists at this level, the circuit is completed to switch C' and no rotational signal is forwarded to the motor 40. That is, neither the forward bus nor the backward bus is energized. If inequality exists at this most significant level, then a bus is energized to initiate rotation of motor 40 in a direction determined by the sign of the resultant from the algebraic subtraction of the present address number from the desired address number. The convention adopted is that if the subtraction is positive the FORWARD bus 110 is energized and if the subtraction is negative the BACKWARD bus 120 is energized.

When a condition of equality is reached at the most significant level, the next significant cam-operated switch is energized and a comparison is effected at this level. This is done by comparing the position of switch C' with the positions of the movable contacts 76 and 77 to the same effect as at the higher level. Thus, if equality exists, the switch D' is energized; while if inequality exists, either the FORWARD or BACKWARD bus is energized depending upon which directional bus was energized by the more significant comparison, the cams being so located that upon equality in the more significant cams the next significant will be either equal or call for energization in the same direction as was called for by the more significant comparison. The last comparison in the diagram of FIGURE 27 is made between the position of switch D' and the position of movable contacts 81 and 82 in the same manner as for the comparison at the position of switch C'.

When the last comparison is satisfied by an "equal to" condition, a circuit is established from the ground line 115 through the main address comparison circuits including the switches B', C' and D' to an EQUAL line 116 and thence through the energizing coil 112 of stop relay 111 to the positive bus 117. Upon energization of the stop relay 111, contacts 113 and 114 are opened to de-energize motor 40 with the magazine storage drum in position where the present address supplied by switches A' through D' corresponds to the desired address supplied by the switches 91 through 94. The magazine containing the slide selected for display is thereby located at the uppermost position on the drum for removal from the container to the slide selector 32.

The directional relay 102 is a latched relay which remains in the position into which it was last actuated until a signal is fed to whichever of the coils 99 and 101 was not last energized. Thus, the last given directional information for the rotation of the motor 40 will remain the same, regardless of the pulsed opening and closing of the switch E' as it is operated by cam E, until such time as the comparison circuits call for a change in direction of rotation of the magazine storage drum. The reversing latching relay 102 has its energizing coils 99 and 101 operated by either the FORWARD bus 110 or the BACKWARD bus 120 through the changeover contacts 97, 98 of relay 95 which is under the control of the address half comparison circuit.

*The slide selector*

The slide selector is indicated generally at 32, located forwardly of the slot 36 on top of the platform 35. The slide selector positions the slide magazine and provides a passageway 121 through which is reciprocated a magazine 122 in the form of an open top rectangular box within which forty slides are stored within slots 123 between inwardly projecting fingers on the opposite sidewalls of the magazine box. These slides are indicated at 124 in FIGURE 5, being provided at their tops with opposite projections 125 by which they are engaged and moved. At the left-hand side of the channel 121 as viewed from the front of the device, there is provided a horizontally extending angle bar 126 on whose vertical leg is supported a guide 127 slidably mounting a rack 128 for horizontal reciprocable motion. The rack 128 is provided with teeth 129 on its top surface meshing with the teeth on a pinion 131 mounted on a shaft 132. The shaft 132 is driven through suitable reduction gear mechanism by a motor 133. Rigidly secured to the rack 128 is a bracket 136 having an adjustable screw stop 137 threaded therein. At its rearward end the rack 128 supports a pivoted finger 138 biased into the position of FIGURE 2 by a finger spring 139 and having an arcuate groove 141 therein adapted to receive an arcuate lug 142 on the exterior sidewall of the magazine 122 when the forward wall of the magazine engages the stop 137.

Upon the shaft 132 are mounted cams F, G, H, I and L controlling the operation of switches F', G', H', I' and L', respectively. A shaft 134 is geared to the shaft 132, as at 135, in a one-to-four ratio so that the shaft 134 makes one revolution for four revolutions of the shaft 132. Upon the shaft 134 are rigidly mounted cams J and K controlling the operation of the switches J' and K', respectively. Switches F' through K' are of the single pole, double throw type, while switch L' is of the single pole, single throw type.

Figure 19:
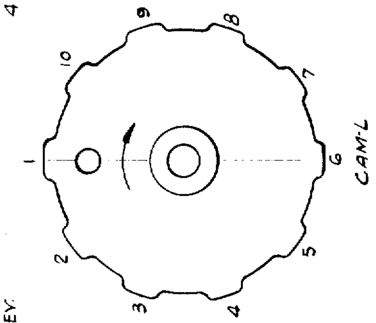
FIGURE 19 is a schematic representation of a clock or time pulse cam operating a switch in the slide logic comparison circuit, and designated "Cam L"
Figure 18:
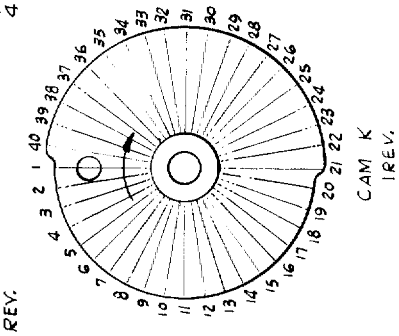
FIGURE 18 is a schematic representation of the more significant cam identifying the group of tens in which the presently positioned slide is located, designated "Cam K"
Figure 17:
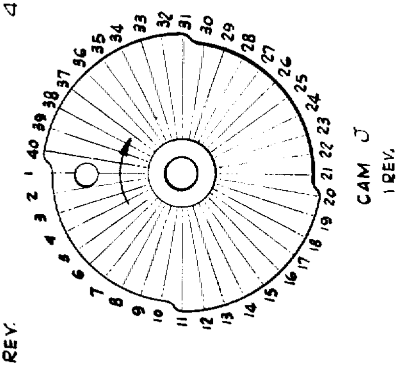
FIGURE 17 is a schematic representation of the less significant of the two decimal cams supplying bit information identifying the group of tens in which the presently positioned slide is located, designated "Cam J"
Figure 20:
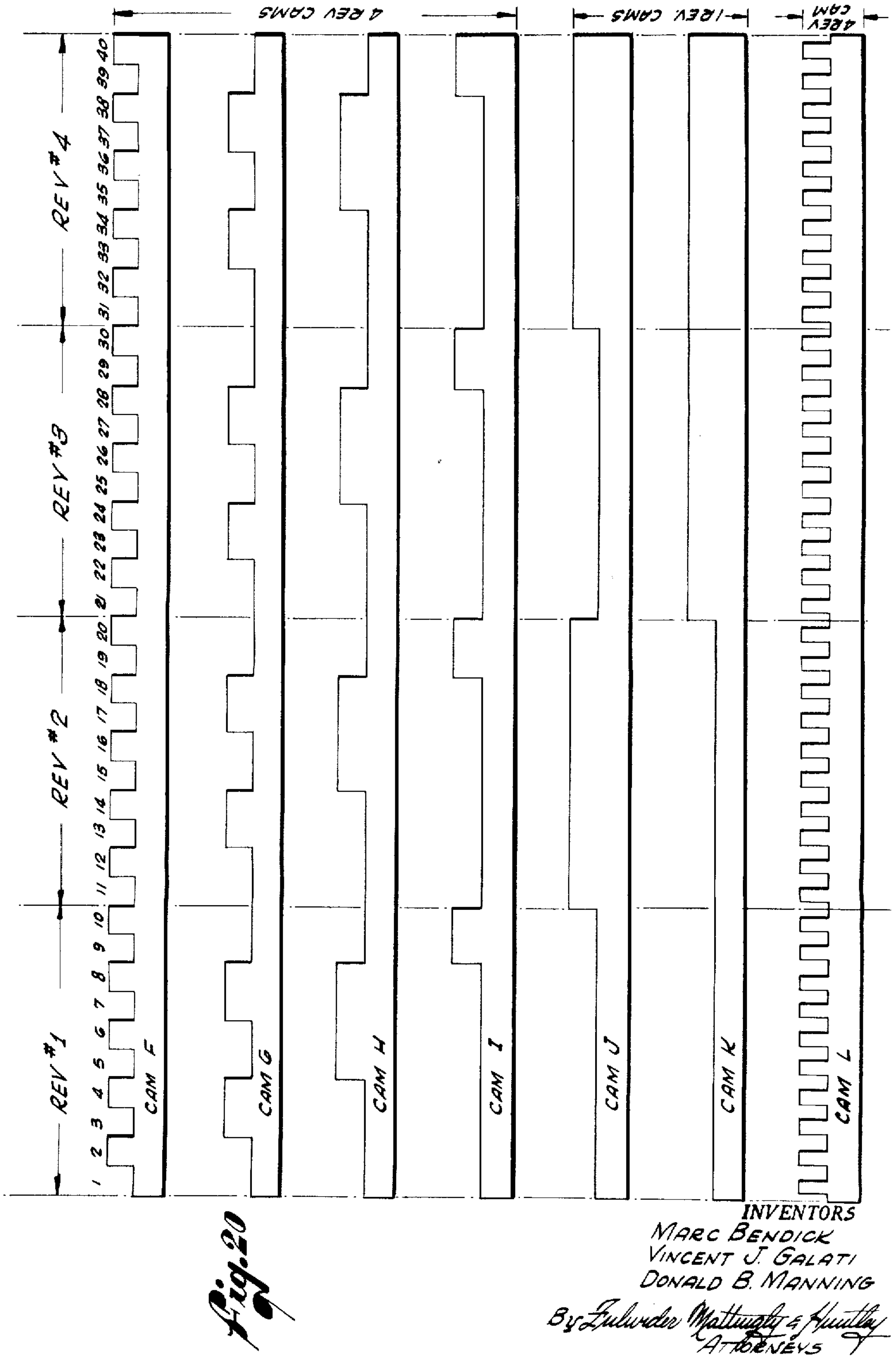
FIGURE 20 is a schematic development of Cams F through L for the single revolution of Cams J and K and the corresponding four revolutions of Cams F through I.

Schematic side elevational views of the cams F through L are shown in FIGURES 13 through 19, respectively. Longitudinal developments of cams F through L are shown in FIGURE 20, and code charts of switch normal and operated positions for the various cams, with a magazine in position to deliver different numbered slides, are shown in FIGURES 21 through 24 for four revolutions of shaft 132 and one revolution of shaft 134.

Figure 14:
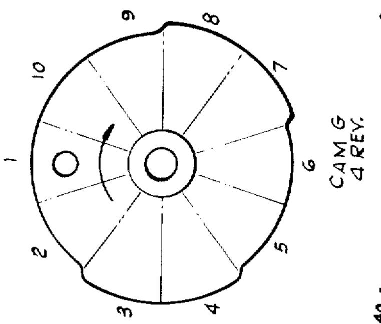
FIGURE 14 is a schematic representation of the next significant cam operating a switch in the slide logic comparison circuit, corresponding to $2^1$ in the binary coding and designated "Cam G"
Figure 13:
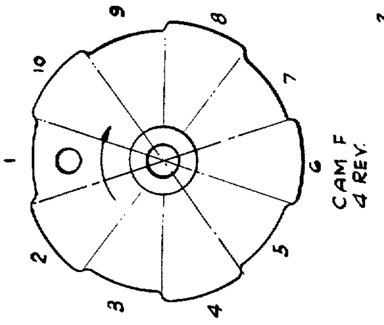
FIGURE 13 is a schematic representation of the least significant cam operating a switch in the slide logic comparison circuit, corresponding to $2^0$ in the binary coding and designated as "Cam F"

Cam F, FIGURE 13, is the least significant cam in the bit information of the straight binary code portion of the binary coded, decimal system corresponding to the $2^0$ position in the code. Cam G, FIGURE 14, is the next significant cam in the straight binary code portion of the system, supplying bit information for the $2^1$ position. Cam H is the next significant cam in the binary code portion of the system, supplying bit information corresponding to the $2^2$ position in the code. Cam I is in the most significant cam in the binary coded portion of the system, supplying bit information for the $2^3$ position in the binary code. Cam J is the lesser significant cam in the decimal portion of the system which identifies the group of ten in which a particular slide is located. Cam K is the more significant cam in the decimal portion of the system. Cam L, FIGURE 19, is a clock pulse cam functioning to avoid ambiguity in the slide selector logic circuit at the time of present address switch changeover and removing the necessity for fine alignement of the informational cams by cooperation with a latching relay. The longitudinal developments of the above cams F through L, showing the relative positions of the lobes thereon, are shown in FIGURE 20.

In the charts of FIGURES 21 through 24 the zeros and units have the same switch position indication of normal and operated, respectively, as in the chart of FIGURE 12.

In a specific embodiment of the invention, the initial position of the magazine when it is fully inserted into the slide selector from the magazine storage drum places the first slide in delivery position and is identified by the binary code 00 0000; thus making the tenth slide position 00 1001 while eleven becomes 01 0000. Similarly, thirty in this coding becomes 10 1001 while thirty-one becomes 11 0000, the significance of the latter bit information being number one in the fourth set of tens, i.e., thirty-one.

The projector into which the slide is placed for the projection of the information thereon upon a viewing screen is indicated generally at 151 and is substantially a standard item whose internal mechanism forms no part of the present invention so that only those parts thereof which cooperate directly with the slide selector and the control circuits will be explained. An operating motor 152 drives a shaft 153 through a double slip clutch 154 represented by a nylon sleeve frictionally receiving the end of the shaft 153 and of a motor driven shaft. Rotation of the clutch 154 is controlled by a solenoid 160 which is momentarily energized or pulsed to permit a rotation of clutch 154 and shaft 153 through 360 degrees. The shaft 153 extends through a hollow shaft 150 which carries a gear 155, meshing with a gear 156 carrying a cam disk 157. The cam disk 157 has a cam groove 158 thereon in which travels a cam follower 159 mounted on a lever 161 having a fixed pivot 162. On opposite sides of the passageway 121 are mounted a pair of vertical guide channels 163 having slidably mounted therein an inverted U-shaped, slide engaging and moving member 164 having opposite legs 165 and a top bight 166. On one of the legs 165 is mounted a lug 167 to which the end of the lever 161 is pivoted with a slotted connection to permit longitudinal movement of the lever 161 relative thereto. Adjacent their upper ends just beneath the bight 166, the legs 165 are provided with fingers 168 having inwardly directed U-shaped end portions 169 adapted to receive the tabs 125 on the slides 124 to effect movement of the slides upwardly out of the magazine 122, as shown in full lines in FIGURE 5. The lever 161 in its upper position engages the roller 171 on the actuator of an electric switch 172 to effect operation thereof.

At the right-hand side of the passageway 121, as viewed from the front of the device, there is disposed a pair of longitudinally offset actuators 173 and 174 engageable by the magazine 122 to effect operation of their respective switches 175 to 176. The actuator 173 is engaged by the magazine when slides 1–40 are in delivery position while actuator 174 is engaged when slides 2–40 are in delivery position.

On the left-hand end of the shaft 150, as viewed from the front, is mounted a hollow disk 177 having a peripheral indexing groove 178 adapted to receive an indexing member 179 therein, the member 179 being normally biased out of the groove by a spring 181 and moved thereinto by a solenoid 182 through a suitable rod and linkage connection. Within the hollow disk 177 is an indexing, slip clutch arrangement, forming a standard part of the projector, and serving to connect the shafts 150 and 153 together in only a unique, indexed relation about their 360° rotation. This clutch is disengaged when the disk 177 is locked by insertion of the member 179 in the groove 178.

*The slide selector comparison circuit*

Figure 28:
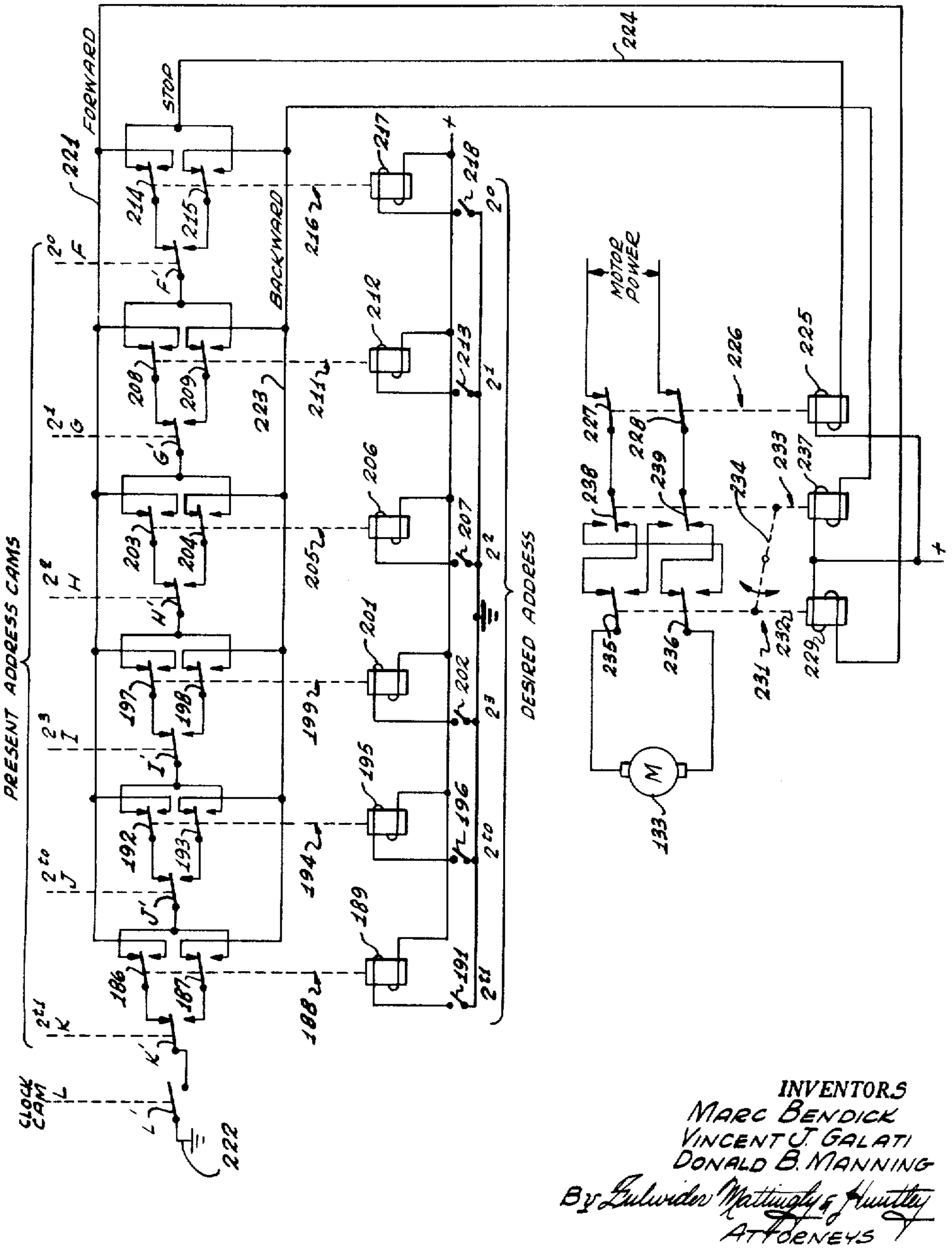
FIGURE 28 is a simplified schematic wiring diagram of the slide logic comparison circuits of the device.

A simplified wiring diagram of the slide selector comparison circuit is shown in FIGURE 28. The present address bit information switches are shown at F′ through K′ and the contact positions with which the switch positions are compared will now be described in connection with the relays which control the contacts and are themselves controlled in accordance with the address of slides selected for delivery and display.

The position of switch K′, the most significant in the decimal portion of the present address, is compared with the positions of contacts 186 and 187 on a relay 188 having an operating coil 189 whose energization is controlled by a switch 191. The position of switch J′ is compared with the positions of the movable contacts 192 and 193 on a relay 194 having an operating coil 195 controlled by a switch 196.

The position of switch I′, giving the most significant information in the straight binary coded portion of the present position address, is compared with the position of movable contacts 197 and 198 on a relay 199 having an operating coil 201 whose energization is controlled by a switch 202. The position of switch H′ is compared with the positions of movable contacts 203 and 204 on a relay 205 having an operating coil 206 whose energization is controlled by a switch 207. The position of switch G′ is compared with the positions of the movable contacts 208 and 209 on a relay 211 having an operating coil 212 whose energization is controlled by a switch 213. The position of switch F′ is compared with the positions of the movable contacts 214 and 215 on a relay 216 having an operating coil 217 whose energization is controlled by a switch 218. The switches 191, 196, 202, 207, 213 and 218 may be operated by computers, cards, tapes or by manual operation to supply, by their positions, the bit information giving the desired position address in the binary coded, decimal system as previously described.

For rotating the motor 133 to move the magazine 122 forwardly, the comparison circuits connect the FORWARD bus 221 to the ground connection 222 while the "go back" signal is transmitted by the comparison circuits connecting the BACKWARD bus 223 to the ground connection 222. A STOP bus 224 is connected to the ground connection 222 when an "equal to" condition exists in the comparison circuit, which condition occurs when the desired slide is placed in the delivery position to be engaged by the slide manipulator 164. The STOP bus 224 energizes the operating coil 225 of a relay 226 whose movable contacts 227 and 228 control the connection of the motor 133 to the motor power line. The FORWARD bus 221 effects energization of the operating coil 229 of a reversing and latching relay indicated generally at 231 and comprising a pair of oppositely moving operators 232 and 233 mechanically interlocked at 234 for movement in reverse directions. The operator 232 is actuated by the operating coil 229 and controls the positions of the movable contacts 235, 236 in the motor reversing circuit. Operator 233 has an operating coil 237 and controls the position of movable contacts 238 and 239 in the motor reversing circuit.

The reversing and latching relay 231 remains in the position into which it was last moved by the energization of the respective coils 229 and 237. As shown in FIGURE 28, the latching relay 231 is in the position where coil 237 was last energized. Further energization of coil 237 has no effect on the position of the latching relay 231. However, should coil 229 be energized, relay 231 will reverse its position to lower the contacts 235 and 236 and raise the contacts 238, 239. The provision of the latching relay 231 permits a periodic opening of the switch L′ by the cam L without interrupting the circuit to motor 133.

The slide selector comparison circuit is effective at any time a magazine is in the slide selector and the switch 175 is operated. Where the desired position address calls for a new magazine, the storage drum comparison circuit is in an "unequal to" condition and the positive circuit to operating coils 189, 195, 201, 206, 212, 217 is opened (shown in FIGURES 29A, 29B, 29C) so the relays 188, 194, 199, 205, 211 and 216 are in normal position, corresponding to an address of 00 0000 for the slide selector. When the magazine 122 is in the slide selector in any address position and a desired position address is inserted in the device, which desired address calls for the magazine which is in the slide selector, the storage drum comparison circuit will be in an "equal to" condition and the drum EQUAL bus will be connected to ground. This permits energization of the selected relays 188, 194, 199, 205 and 211 (FIGURES 29A, 29B, and 29C) to insert the desired position address.

Whether the relays are energized to give a true desired position address or are de-energized to give a fictitious address of 00 0000, if a slide selector magazine 122 is in position to operate switch 175, the comparison circuit operates to subtract the present address number from the desired address number and if the answer is positive, the FORWARD bus 221 is connected to the ground connection 222 to energize operating coil 229 of the latching relay 231 and effect forward rotation of the motor 133 to place the higher number desired slide in the delivery position. Contrariwise, should the subtraction of the present address number from the desired address number have a negative result, the BACKWARD bus 223 will be connected to the ground connection 222 to energize the coil 237 of latching relay 231 to rotate the motor 133 in the backward direction and present the lower number desired slide at the delivery station.

The direction in which the motor 133 is energized is determined by the most significant of the switches K′, J′, I′, H′, G′ and F′, in that order, which gives an "unequal to" condition. Thus, if switch K′ and relay 188 are both operated or both unoperated an "equal to" condition exists at this most significant point and the comparison moves over to the next circuit, involving switch J′ and contacts 192, 193, and similarly to the switches I′, H′, etc., until an "unequal to" condition is reached. If the "unequal to" condition reached is that of the cam switch operated, the relay unoperated, the answer to the address subtraction is negative since the present address number is greater than the desired address number and the BACKWARD bus 223 will be energized to effect rotation of motor 133 backward until the desired slide is placed at the delivery position, indexed with the slide manipulator 164. At this time the STOP bus 224 becomes connected, through the comparison circuit, to the ground connection 222 and operating coil 225 of relay 226 is energized to move contacts 227 and 228 to open position and disconnect motor 133 from the power circuit.

On the other hand, if the first "unequal to" condition in decreasing significance is a condition where the cam switch is not operated while the relay is operated, then the address subtraction answer is positive and the FORWARD bus 221 is connected to the ground connection 222 to energize coil 229 of relay 231 and effect energization of the motor 133 in a forward direction. When the higher number slide here selected is in the delivery positon, relay 225 is again energized to disconnect the motor 133 from the power circuit and stop movement of the magazine 122.

*The magazine transport mechanism*

The magazine transport mechanism indicated generally at 33 functions to insert a magazine 122 from its storage drum container 58 into the passageway 121 in the slide selector 32 and to retrieve the magazine 122 from the passageway 121 and return it into its appropraite drum container. The rear wall of each magazine 122 is provided with a magnetic plate 241 for engagement with and magnetic securement to an electromagnet 242 mounted on the forward end of a horizontally extending push rod 243 aligned with the drum container 58 at the top of the drum and with the passageway 121. The push rod 243 is guided for reciprocation within a pair of guides 244 and 245 having suitable bores therethrough receiving the rod 243 and mounted upon brackets 246 and 247, respectively. A yoke 248 is pivotally mounted on the push rod 243 and has one end of an operating rod 249 rigidly mounted therein. The opposite end of the operating rod 249 is slidably received within a pivotally mounted sleeve 251. A sleeve 252 is slidably mounted on the operating rod 249 intermediate its ends and has pivotally connected thereto a crank arm 253 rigidly mounted on a shaft 254. The brackets 246 and 247 are rigidly secured on a mounting plate 255 bolted to a bracket 256 which is in turn mounted on the undersurface of the platform 35. An electric motor 257 drives the shaft 254 through a reduction gear mechanism, not shown. Stationarily mounted on the plate 255 are limit switches 258 and 259 whose actuators are engaged by the operating rod 249 in the extreme counterclockwise position thereof, as viewed in FIGURE 1. An electric switch 261 is mounted on the plate 255 in position to have its actuator engaged by the sleeve 252 when the operating rod 249 is in a substantially vertical position. A pair of electric switches 262 and 263 are mounted in superimposed relation above the platform 35 at the left-hand side of the pasageway 121, as viewed from the front, in position to have their actuators engaged by a magazine 122 when it extends into the passageway 121. In the portion of the wiring diagram shown in FIGURE 29C, the motor 257 is diagrammatically illustrated and its automatic brake and the contactors and circuits controlling its direction of rotation are indicated within the control box 265, the reversing circuits being under the control of a relay 266 having an energization coil 267 and a double-throw contact 268.

*The wiring diagram*

Figure 29A:
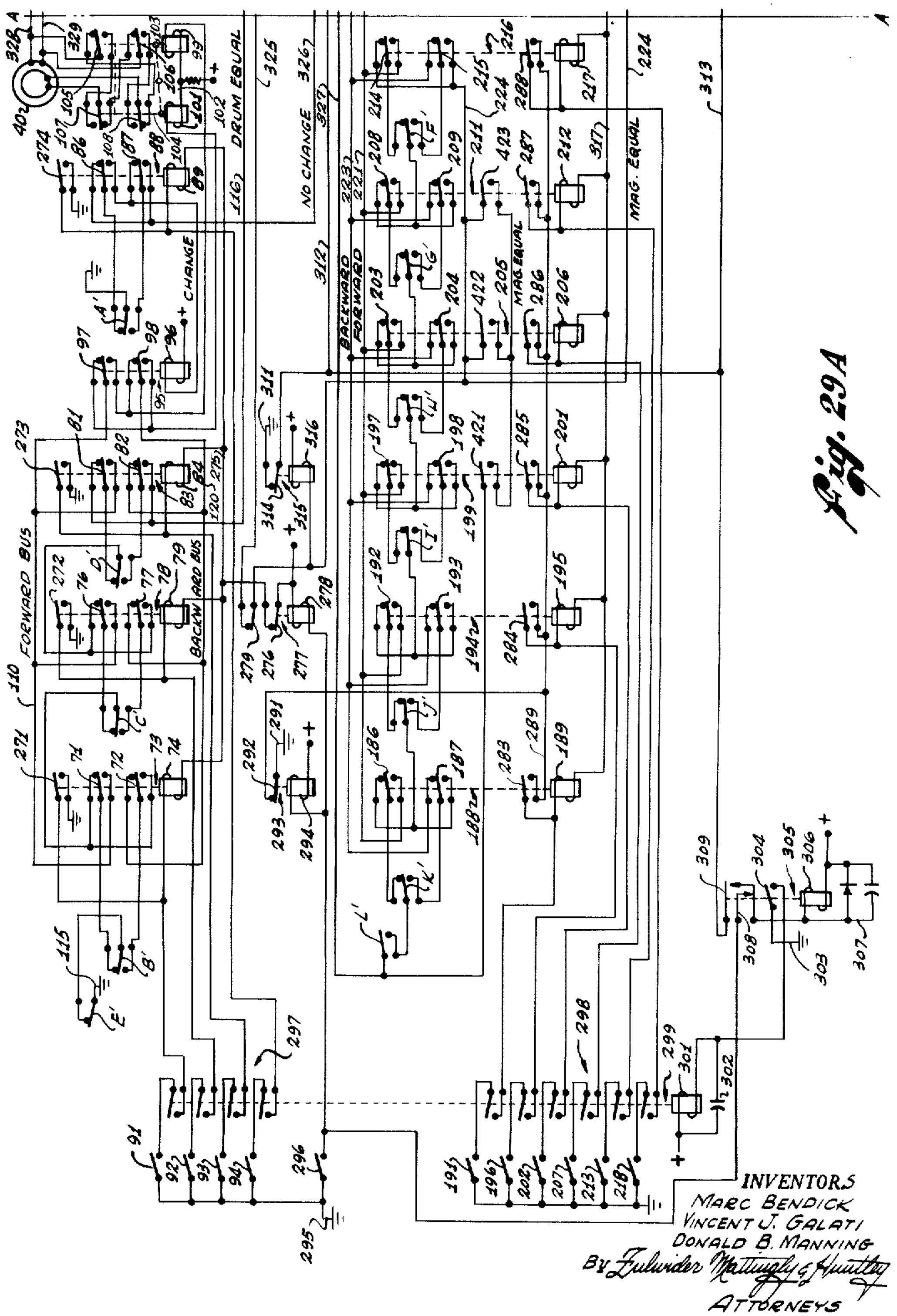
FIGURES 29A, 29B and 29C collectively are a schematic wiring diagram for the device.
Figure 29B:
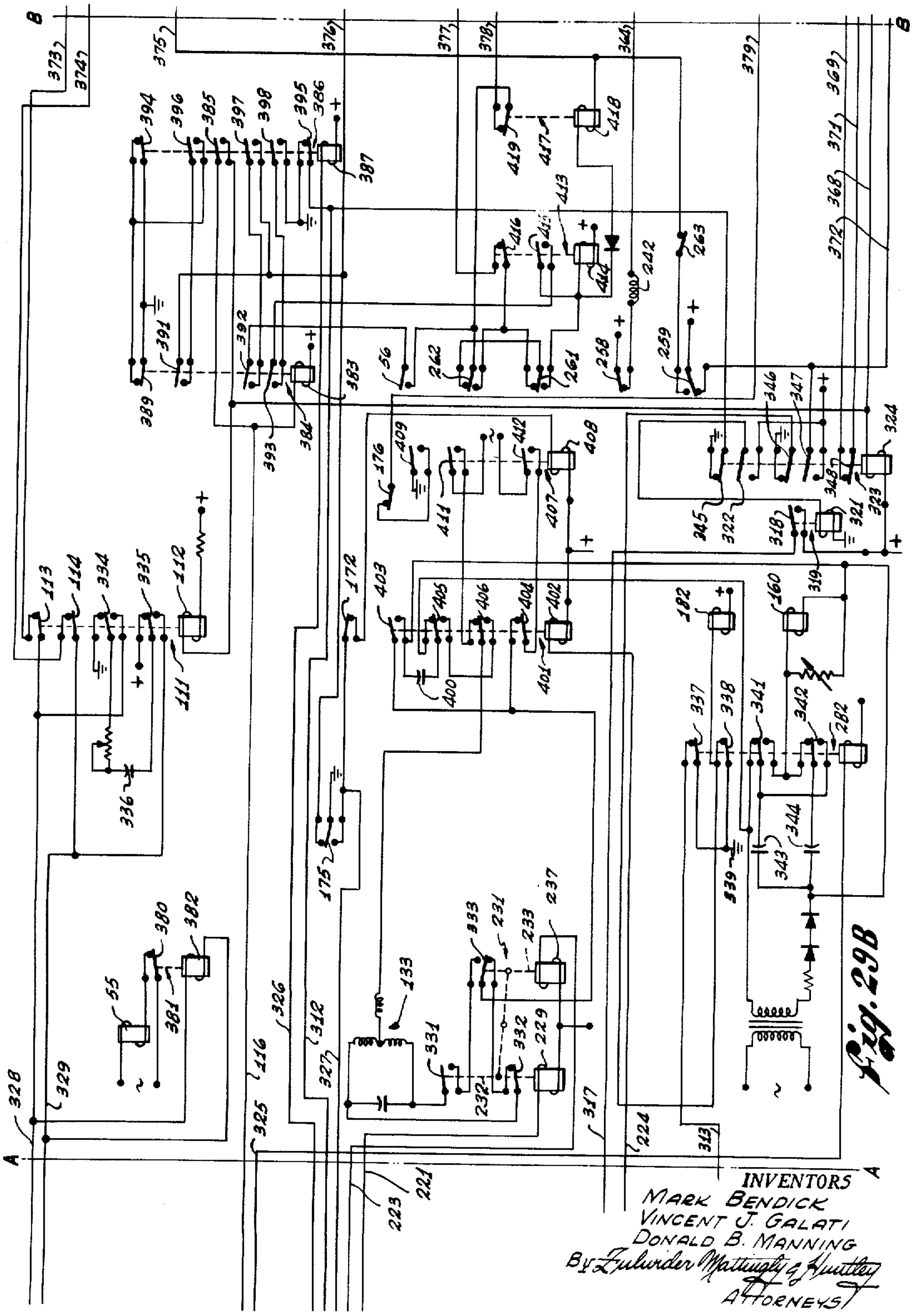
Figure 29C:
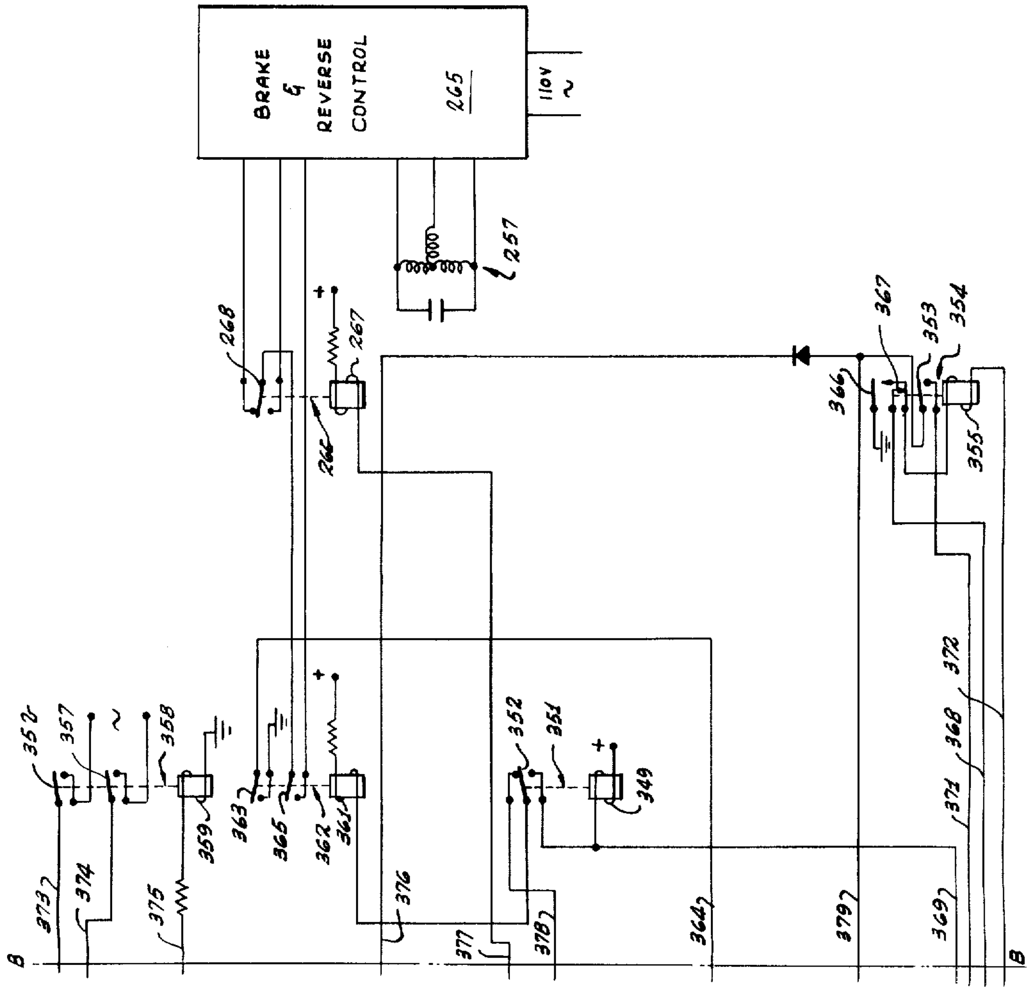

The wiring diagram for the random access storage and recall device according to the present invention is shown in FIGURES 29A, 29B and 29C, collectively. It includes the control circuits and switching elements previously described and, in addition, includes other components and control elements which appear in the wiring diagram for the first time. In the wiring diagram of FIGURES 29A, 29B and 29C the control elements of FIGURES 27 and 28 have been given the same reference numerals, although these elements may be expanded to include additional functions; thus the desired position address relays include holding contacts and the operating motors 40 and 133 are shown as alternating current motors rather than the D.C. motors shown in FIGURES 27 and 28 for simplicity. Other modifications of the previously described components will become apparent as the description progresses.

Relays 73, 78, 83 and 88 are provided with holding contacts 271, 272, 273 and 274, respectively, which shunt the relay operating coils to ground to form holding circuits. The positive sides of the coils 74, 79, 84 and 89 are connected to a line 275 which is connected to the positive potential through the normally closed contact 276 of a relay 277 having an operating coil 278. Relay 277 has a second normally closed contact 279 which connects the magazine EQUAL bus 224 to the operating coil 281 of a relay 282.

Relays 188, 194, 199, 205, 211 and 216 are provided with holding contacts 283, 284, 285, 286, 287 and 288, respectively, which control shunt circuits for the operating coils of the relays to a line 289 which is connected to a ground connection 291 through the normally closed contact 292 of a relay 293 having an operating coil 294. Operating coils of relays 294 and 278 are connected to positive potential at one side and on the other side to a ground connection 295 through a momentary contact, normally open switch 296 functioning as a transmittal switch.

Between the storage drum desired address bit information switches 91 through 94 and the energizing coils of the desired address relays of the magazine drum comparison circuits are interposed a bank of normally open contacts indicated generally at 297. Between the magazine desired address bit information switches 191, 196, 202, 207, 213 and 218 and the energizing coils of the magazine desired address relays in the slide selector comparison circuits are interposed a bank of normally open contacts indicated generally at 298. The contacts 297 and 298 are controlled by a relay 299 having an operating coil 301. A condenser 302 across the coil 301 provides a time delay after de-energization of the coil before drop out of the relay. Coil 301 is connected at one side to the positive potential and the other side is connected to ground at 303 through the normally open contact 304 of a relay 305 having an operating coil 306 across which is connected a short time delay shunt 307. Relay 305 is also provided with a normally closed contact 308 and a normally open contact 309.

A ground connection at 311 is connected to lines 312 and 313 through the normally closed contacts 314 of a relay 315 having an operating coil 316. The positive sides of the operating coils 189, 195, 201, 216, 212 and 217 are connected to a line 317 which is connected to a positive potential source through the normally open contact 318 of a relay 319 having an operating coil 321. Operating coil 321 of relay 319 is controlled through the normally open contact 322 of a relay 323 having an operating coil 324.

In view of the motor 133 being shown in FIGURE 29B as an A.C. motor, the contacts on latching relay 231 are changed so that operator 232 controls a normally open contact 331 and a normally closed contact 332, while operator 233 controls a double-throw contact 333. Relay 111 has double-throw contacts 334 and 335 controlling a charging circuit for the condenser 336 and a discharge circuit therefor for braking the motor 40. Relay 282 has normally closed contacts 337 and 338 controlling circuits to a ground connection 339. Relay 282 also controls the double-throw contacts 341 and 342 controlling charging and discharging circuits for the condensers 343 and 344 which supply pulses to the clutch solenoid 160. Relay 323 has normally closed contacts 345 and 346 controlling ground connections and a normally open contact 347 supplying a connection to the positive potential. Relay 232 also has a normally closed contact 348 in the energizing circuit to the operating coil 349 of a relay 351 having a double-throw contact 352. The energizing circuit for coil 349 also includes the normally open contact 353 of a relay 354 having an operating coil 355.

In series with the normally closed contacts 113 and 114 are the normally open contacts 356 and 357 of a relay 358 having an operating coil 359 which insures that power to motor 40 cannot be supplied in case of failure of control potential. The contact 352 of relay 351 controls the energization of the operating coil 361 of a relay 362. Relay 362 has a normally open contact 363 controlling a ground connection to line 364 and a normally open contact 365 in the circuit to the control 265 for the motor 257 which drives the magazine transport mechanism. The relay 354 has a normally open contact 366 supplying a holding ground connection for its energizing coil 355 and a normally closed contact 367 through which the operating coil 355 is initially energized flom the line 368.

The energization of the solenoid 55 operating the storage drum indexing arm 53 is controlled by the normally closed contact 380 of a relay 381 having an operating coil 382 connected across the motor supply lines 328 and 329 so that the coil 382 is energized whenever motor 40 is energized for rotation. Energization of the coil 382 effects opening of the contact 380 to de-energize the solenoid 55 and permit the arm 53 to move out of the notch 49 with which it is associated, under the bias of spring 54.

The drum EQUAL line 116 controls the energization of operating coil 383 of a relay 384 and, through the normally open contact 385 of a relay 386, supplies a connection to the negative side of coil 324 at line 368. Relay 386 has an operating coil 387 energized through line 326 which is connected to ground through relay 88 and cam-operated switch A′ if no change is called for in the rotational sense of the signal for the storage drum.

The relay 384 has a normally closed contact 389 and normally open contacts 391, 392 and 393. The relay 386 has normally closed contacts 394 and 395 and normally open contacts 396, 385, 397 and 398. A relay 401 has an operating coil 402 controlled through magazine EQUAL line 224 and operates a normally open contact 403, a normally closed contact 404 and double-throw contacts 405 and 406. A relay 407, having an operating coil 408 controlled through switches 172 and 175, operates normally open contacts 409, 411 and 412. A relay 413 with an operating coil 414 has normally open and normally closed contacts 415 and 416, respectively. A relay 417 has an operating coil 418 and controls a normally closed contact 419.

Relays 199, 205 and 211 have additional movable contacts 421, 422 and 423, respectively, which supply a stop signal upon the insertion of erroneous magazine desired position address wherein the slide number in the straight binary coded portion of the information is above 10. Thus, any number above 1001 in the straight binary coded portion of the desired magazine position address information will connect the magazine EQUAL line to ground and stop the apparatus.

*Operation*

The operation of the specific embodiment of the present invention will first be described on the assumption that a magazine is located in the slide selector in a slide delivery position, with the last recalled slide up in the projector in display position. The desired address information for the next slide to be displayed in the projector is placed on switches 91 through 94 for the desired storage drum position and on switches 191, 196, 202, 207, 213 and 218 for the desired magazine position to place the selected slide in position to be engaged by the slide manipulator 164. The address transmittal switch 296 is now momentarily closed to energize relay operating coils 294, 278 and 306. The energization of coil 294 operates relay 293 to open contact 292 and therewith the holding circuits to relays 188, 194, 199, 205, 211 and 216 which now drop out. Energization of coil 278 operates relay 277 to de-energize line 275 and drop out all of relays 73, 78, 83 and 88. Operation of relay 277 also opens contact 276 to de-energize relay 282. Drop out of relay 282 sends a pulse to the clutch solenoid 160 from whichever of condensers 343, 344 is charged. This initiates rotation of shaft 153 from the motor 152. Drop out of relay 282 also opens contact 388 to de-energize the solenoid 182 and release the index member 179 to permit rotation of the hollow disk 177. Shaft 150 rotates with shaft 153 and, through gears 155 and 156, rotates cam disk 156 to effect counterclockwise movement of the lever 161, as viewed in FIGURE 5, and lowering of the slide manipulator 164 to place the previously displayed slide within the magazine.

Solenoid 182 is re-energized through normally closed contact 346 of relay 323 which became de-energized with opening of the drum EQUAL line. Solenoid 182 biases the index member 179 inwardly and when the slide manipulator 164 is in its lowermost position with the slide returned to the magazine, the member 179 slips into the groove 178 and locks the disk 177 with the slide manipulator down. Shaft 150 is thus held against rotation and the clutch within disk 177 releases to permit an additional 180° rotation of shaft 153. Drop out of relay 282 also opened contact 337 to open the ground connection to line 313. Drop out of relay 323 also de-energizes relay 319 which in turn disconnects the energizing coils of all of relays 188, 194, 199, 205, 211 and 216 from the positive potential to give a fictitious desired position address of 00 0000 to the magazine.

Energization of coil 306 is through normally closed contact 308. When relay 305 operates its opens this contact but closes contact 309 which establishes a ground for coil 304 through contact 314 which is closed since coil 316 is de-energized by the magazine EQUAL line being open. Closing of contact 304 on relay 305 energized operating coil 301 of the relay 299 which operates to close its banks of contacts 297 and 298 and transmit the desired address information for the storage drum and magazine to the comparison circuits. Relays 188, 194, 199, 205, 211 and 216 are not energized where called for by the information switches because the positive potential thereto is interrupted at contacts 318 of relay 319. Relay coils 294 and 278 were de-energized with the opening of momentary contact switch 296 and relays 293 and 297 returned to their normal positions. This reconnects line 275 to the positive control potential so that relays 73, 78, 83 and 88 will operate in accordance with the information transmitted from the desired address switches 91 through 94 to the energizing coils 74, 79, 84 and 89.

With the slide down, switch 172 is closed and this energizes the operating coil 408 of relay 407 through the contacts of switch 175 which had been operated by the positioning of a magazine within the slide selector. Operation of relay 407 closes contacts 411 and 412 which connect the alternating current source to the motor 133 through normally closed contacts 404 and 406 of relay 401. The BACKWARD line 223 is energized through the most significant cam position for the magazine which had an operated switch, that is a 1 bit information. BACKWARD line 223 energizes operating coil 237 of the latched in, reversing relay 231 which remains in the position shown in FIGURE 29B, and the motor 133 rotates backwardly.

Motor 133 continues to operate until the magazine is driven fully back into its initial position corresponding to bit information 00 0000 on the cam switches, which is the same as the desired address bit information appearing on the opened relays of the slide selector comparison circuit. This again grounds the magazine EQUAL line to energize the operating coil 402 of relay 401 to disconnect the motor 133 from the power supply and connect it to a dynamic braking circuit including contacts 403 and 405 and condenser 400. The grounding of the magazine EQUAL line does not result in the slide manipulator 164 moving upwardly at this time because the solenoid 182 is energized and the indexing member 179 is in the notch 178 and prevents rotation of the disk 177 and the cam 156.

In the initial position of the magazine, switch 176 closes to complete a circuit through contact 409 to line 379 and thence through contact 353 to line 371 and thence through contact 348 to line 369 and the energizing coil 349 of relay 351 which closes to operate contact 352 and energize operating coil 361 of relay 362. Operation of relay 362 closes contact 365 to energize motor 257 and also closes contact 363 to energize the electromagnet 242 on the forward end of the push rod 243.

The push rod 243 is in its forward position where it remained after inserting the last delivered magazine into the slide projectors. It is therefore desired now to reverse the direction of rotation of the motor 257 to withdraw that magazine back into its container on the storage drum. The operating coil 267 of relay 266 was de-energized when the drum EQUAL line was opened by the drop out of the comparison circuit relays and was not re-energized, on the assumption that the new desired address is not the same as the present position address. This places contact 268 in its normal position, shown in FIGURE 29C, which is the position for effecting reverse rotation of the motor 257.

At almost the end of the reverse stroke of the push rod 243, switch 258 is opened by the rod 249 to de-energize the electromagnet 242 and release the magazine 122 which it had withdrawn into its storage drum container. Switch 259 is also operated by the rod 249 to open the circuit to the energizing coil 355 of the relay 354 which thereupon drops out to de-energize the operating coil 361 of the relay 362 and thereby open contacts 363 and 365 to de-energize the motor 257 which is braked to a stop through the control 265. Switch 175 returned to normal position when it was released by the magazine, but without effect. The operation of limit switch 259 by the rod 249 not only de-energized motor 257 but also energized the operating coil 418 of relay 417 through the contacts of switch 253 which closed when the magazine left the slide selector. Contact 419 now opens, but without effect.

Operation of switch 259 also energizes the operating coil 359 of relay 358 which operates to connect the motor 40 to the alternating current line through its contacts 356 and 357 and the normally closed contacts 113 and 114 of relay 111. The direction of rotation of the motor 40 will be determined from the drum address comparison circuits by the subtraction of the present address number from the desired address number, with energization of the FORWARD bus if the result is positive and of the BACKWARD bus if the result is negative. This is effected at the comparison circuits provided for the cam-operated present address switches B′, C′ and D′. The present half address switch A′ is compared with the desired address half at the contacts 86 and 87 to secure energization of either the CHANGE line and thence of the energizing coil 96 of relay 97, or of the NO CHANGE line 326 which energizes the operating coil 387 of relay 386. The operation of this logic circuit in the subtraction of the present address number from the desired address number and the effect of the half address comparison was explained more fully hereinbefore in connection with the description of the wiring diagram of FIGURE 27.

The motor 40 operates to rotate the magazine storage drum in the direction selected by the logic circuits until the present address coincides with the desired address and the drum EQUAL line 116 is connected to ground. At this time, operating coil 383 is energized to operate relay 384 and operating coil 112 is energized through the contact 385 of relay 386. The operation of relay 111 from the energization of its operating coil 112 opens contacts 113 and 114 to de-energize motor 40 and connects the motor through contacts 334 and 335 to the dynamic braking circuit including the condenser 336. Opening of contacts 113 and 114 also de-energizes the operating coil 382 of relay 381 whose contact 380 closes to energize the solenoid 55 and move the arm 53 into the notch 49 located thereat to index the storage drum in the desired position. The operation of the solenoid 55 also closes switch 56.

With the realization of the drum EQUAL condition, circuits are established to the operating coils 324 of relay 323 and 355 of relay 354 to effect operation thereof. The operation of relay 323 closes the energizing circuit to coil 319 through contact 322 which operates relay 319 to close contact 18 and replace the positive potential on the line 317, whereupon the coils 189, 195, 201, 206, 212 and 217 are energized in accordance with the information furnished to them by the desired magazine position address as supplied in bit form from the switches 191, 196, 202, 207, 213 and 218 and transmitted through the bank of contacts 298. This has no effect at this time since switch 175 is in normal position and line 327 to L' is not grounded.

With the closing of contact 56 and energizing circuit is established through the normally closed contacts 419 and 354 of relays 417 and 351 to the operating coil 361 of relay 362 whose contacts close to energize the electromagnet 242 through the contact 363 and, through its contact 365, signal control 265 to energize the motor 257. The energizing coil 267 of relay 266 is now energized through contacts 416, 261 and 262 and operates the contact 268 to tell the motor 257 through the control 265 to rotate in a forward direction. This rotation continues with the push rod 243 moving the selected magazine 122 into the slide selector 32 until the switch 175 is operated by engagement of the magazine with the switch operator 173. The energizing circuit to operating coil 361 is opened at switch 175 and the dynamic braking circuit automatically applied to the motor 257 through the control 265. De-energization of the operating coil 361 of relay 362 opens its contact 363 to de-energize the electromagnet 242.

The magazine 122 is now in its initial position, corresponding to bit information 00 0000, with the lug 142 engage in the notch 141 in the finger 138 on the rack 128. The operation of switch 175 establishes the ground circuit leading to clock pulse switch L' by grounding the line 327. This also energizes the operating coil 408 of the relay 407 through the "slide down" switch 172 to connect the motor 133 to the alternating current line through the normally closed contacts 404 and 406 of de-energized relay 401. The motor 133 now operates in the forward direction since the magazine FORWARD bus was energized by the logic circuit, the present position address being 00 0000 which is less than any desired address for the slide selected for display, assuming the first slide is not selected in which case an "equal to" condition would exist. The motor 133 then rotates in a forward direction until an "equal to" condition exists for the magazine, with the selected slide located in delivery position for engagement by the slide manipulator 164.

The magazine EQUAL line completes the energizing circuit to the operating coil 281 of relay 282 which operates to open the circuit to the solenoid 182 and release index member 179 to supply a pulse from condensers 343, 344 to the clutch solenoid 160. The shaft 153 now rotates 180° with no effect. Then the clutch in disk 177 indexes to connect shaft 153 to shaft 150 which rotates with shaft 153 for the remaining 180° of its rotation to rotate the cam 156 and move the lever 161 and the slide manipulator 164 upwardly to raise the selected slide into the projector. This places the parts in the positions in which they exist at the start of the description of the operation of the device with a new selected slide in the projector.

A similar operation is effected for recalling any slide selected for display, except that if a drum "equal to" condition exists for the present and desired addresses, the operation necessary to change the magazine is bypassed. Thus, if the desired address calls for the magazine already in the slide selector, the drum EQUAL line remains energized, the positive potential line 317 is energized and relays 188, 194, 199, 205, 211 and 216 are immediately operated to place the actual desired address information in the slide selector comparison circuits. These logic circuits signal the motor 133 to operate in the direction determined by the sign of the answer to the subtraction of the magazine present address number from the desired address number to index the slide selected for display with the slide manipulator 164. The operations to stop the motor and raise the slide follow, as described above.

While a certain preferred embodiment of our invention has been specifically shown and described, it will be understood that the invention is not limited thereto, since many variations will be apparent to those skilled in the art, and the invention is to be given its broadcast interpretation within the terms of the following claims.

We claim:

1. In an indexing device, a rotary member having a plurality of designated, arcuately-spaced positions therearound; a station associated with said rotary member; means for identifying the position on said rotary member presently located at said station; means for identifying a desired position on said rotary member to be placed at said station; means identifying said rotary member positions by number; logic means for subtracting one of said present and desired position numbers from the other and selecting the direction of rotation of said rotary member in accordance with the sign of the resultant; and means activated by said logic means for effecting rotation of said rotary member in accordance with the selected direction to place the desired position at said station.

2. In an indexing device, a rotary member having a plurality of designated, arcuately-spaced positions therearound; a station associated with said rotary member; means for identifying the position on said rotary member presently located at said station; means for identifying a desired position on said rotary member to be placed at said station; means identifying said rotary member position by number; logic means for subtracting one of said present and desired position numbers from the other and selecting the direction of rotation of said rotary member in accordance with the sign of the resultant; means in said logic circuit responsive to the location of said present and desired positions on different halves of said rotary member for reversing the sign sense of the resultant of said logic subtraction to reverse the direction signal for rotation of said rotary member to secure the shortest movement thereof to change from said present to said desired position at said station; and means activated by said logic means for rotating said rotary member to index said desired position with said station.

3. In a storage and recall device, a rotary member having a plurality of designated, arcuately-spaced positions therearound; a delivery station associated with said rotary member; means for identifying the position on said rotary member presently located at said delivery station; means for identifying a desired positon on said rotary member to be presented to said delivery station; logic means for determining the shortest direction of rotation of said rotary member to change from said present position to said desired position at said delivery station; means activated by said logic means for rotating said rotary member in said shortest direction to present said desired position to said station; a plurality of magazines supported on said rotary member at said positions; a plurality of items stored in said magazines in identified positions therein; means adjacent to said delivery station for removing a magazine positioned thereat from the rotary member; and means providing a fixed delivery location at said station; and means for positioning said magazine to place an item selected for recall at the fixed delivery location.

4. In a storage and recall device, a rotary member having a plurality of designated, arcuately-spaced positions therearound; a delivery station associated with said rotary member; means for identifying the position on said rotary member presently located at said delivery station; means for identifying a desired position on said rotary member to be presented to said delivery station; logic means for determining the shortest direction of rotation of said rotary member to change from said present position to said desired position at said delivery station; means activated by said logic means for rotating said rotary member in said shortest direction to present said desired position to said station; a plurality of magazines supported on said rotary member at said positions; a plurality of items stored in said magazines in identified positions therein; means adjacent to said delivery station for removing a magazine positioned thereat from the rotary member; means providing a fixed delivery location at said station; additional logic means for comparing the position in the magazine located at said delivery location with a position to be placed at said delivery position to present an item selected for recall to a second delivery station; and means activated by said additional logic means for moving said magazine to place said desired position therein at said delivery location.

5. In a storage and recall device, a rotary member having a plurality of designated, arcuately-spaced positions therearound; a delivery station associated with said rotary member; means for identifying the position on said rotary member presently located at said delivery station; means for identifying a desired position on said rotary member to be presented to said delivery station; logic means for determining the direction of rotation of said rotary member to change from said present position to said desired position at said delivery station; means activated by said logic means for rotating said rotary member in said direction to present said desired position to said station; a plurality of magazines supported on said rotary member at said positions; a plurality of items stored in said magazines in identified positions therein; means adjacent to said delivery station for removing a magazine positioned thereat from the rotary member; means providing a fixed delivery location at said station; additional logic means for comparing the present position in the magazine located at said delivery location with a desired position to be placed at said delivery location to present an item selected for recall to said delivery location; means activated by said additional logic means for moving said magazine to place said desired position therein at said delivery location, said additional logic means including comparison circuits for subtracting the address number of the position in the magazine at the delivery location from the address number of the position therein to be placed at the delivery location and selecting a direction of movement of said magazine in accordance with the sign of the resultant; and means activated by said additional logic means for effecting movement of said magazine in said direction to place said desired position therein at the delivery location.

6. In a storage and recall device, a rotary member having a plurality of designated, arcuately-spaced positions therearound; a delivery station associated with said rotary member; means for identifying the position on said rotary member presently located at said delivery station; means for identifying a desired position on said rotary member to be indexed with said station; means for identifying said rotary member positions by number; logic means for subtracting one of said present and desired position numbers from the other and selecting the direction of rotation of said rotary member in accordance with the sign of the resultant; means activated by said logic means for effecting rotation of said rotary member in accordance with the selected direction to place the desired position at said station; means providing a fixed delivery location at said station; a plurality of magazines supported on said rotary member at said positions therearound; a plurality of items stored in said magazines in identified positions therein; means adjacent to said delivery station for removing a magazine positioned thereat from the rotary member; and means for positioning said magazine in said station to present an item selected for recall at said fixed delivery location.

7. In a storage and recall device, a rotary member having a plurality of designated, arcuately-spaced positions therearound; a delivery station associated with said rotary member; means for identifying the position on said rotary member presently located at said delivery station; means for identifying a desired position on said rotary member to be indexed with said station; means for identifying said rotary member positions by number; logic means for subtracting one of said present and desired position numbers from the other and selecting the direction of rotation of said rotary member in accordance with the sign of the resultant; means in said logic circuit responsive to the location of said present and desired positions on different halves of said rotary member for reversing the sign sense of the resultant of said logic subtraction in order to reverse the direction of rotation of said rotary member so as to secure the shortest movement thereof to change from said present to said desired position at said delivery station; means activated by said logic means for rotating said rotary member to index said desired position with the delivery station; means providing a fixed delivery location at said station; a plurality of magazines supported on said rotary member at said positions therearound; a plurality of items stored in said magazines in identified positions therein; means adjacent to said delivery station for removing a magazine positioned thereat from the rotary member; additional logic means for comparing the position of the magazine at said fixed delivery location with a position to be located at the delivery location to present an item selected for recall at said fixed delivery location; and means activated by said additional logic means for moving said magazine to position the selected item at the delivery location.

8. In a storage and recall device, a rotary member having a plurality of designated, arcuately-spaced positions therearound; a delivery station; means for identifying the position on said rotary member presently located at said delivery station; means for identifying a desired position on said rotary member to be indexed with said station; means for identifying said rotary member positions by number; logic means for subtracting one of said present and desired position numbers from the other and selecting the direction of rotation of said rotary member in accordance with the sign of the resultant; means in said logic circuit responsive to the location of said present and desired positions on different halves of said rotary member for reversing the sign sense of the resultant of said logic subtraction so as to reverse the direction of rotation of said rotary member; means activated by said logic means for rotating said rotary member to index said desired position with the delivery station; means providing a fixed delivery location at said station; a plurality of magazines supported on said rotary member at said positions therearound; a plurality of items stored in said magazines in identified positions therein; means adjacent to said delivery station for removing a magazine positioned thereat from the rotary member; additional logic means for comparing the position of the magazine at said delivery location with a desired position to present an item selected for recall at said delivery location; means activated by said additional logic means for moving said magazine to position the selected item at the delivery location, said additional logic means including comparison circuits for subtracting the address number of the position of the magazine at the delivery location from the address number of the position thereof to be located at the delivery location and selecting a direction of movement of said magazine in accordance with the sign of the resultant; and means activated by said additional logic means for effecting movement of said magazine in said direction to position the selected item at the delivery location.

9. In a storage and recall device, a rotary member having a plurality of designated, arcuately-spaced positions therearound; a delivery station associated with said rotary member; means for identifying the position on said rotary member presently located at said delivery station; means for identifying a desired position on said rotary member to be indexed with said station; means for identifying said rotary member positions by number; logic means for subtracting one of said present and desired position numbers from the other and selecting the direction of rotation of said rotary member in accordance with the sign of the resultant; means activated by said logic means for effecting rotation of said rotary member in accordance with the selected direction to place the desired position at said delivery station; means providing a fixed delivery location at said station; a plurality of magazines supported on said rotary member at said positions therearound; a plurality of items stored in said magazines in identified positions therein; means adjacent to said delivery station for removing a magazine positioned thereat from the rotary member; additional logic means for comparing the position of the magazine at the delivery location with a position to be located at the delivery location to present an item selected for recall at said delivery location; means activated by said additional logic means for moving said magazine to position the selected item at the delivery location, said additional logic means including comparison circuits for subtracting the address number of the position of the magazine to be located at the delivery location from the address number of the desired position thereof and selecting a direction of movement of the magazine in accordance with the sign of the resultant; and means activated by said additional logic means for effecting movement of said magazine in said direction to position the selected item at the delivery location.

10. A storage and recall device for a plurality of items comprising: a rotary storage drum having a plurality of containers therearound; a plurality of magazines in said containers; a plurality of stored items in said magazines in identified positions therein; an item selector adjacent to said storage drum; mechanism for transporting a selected magazine between said storage drum and said item selector; a delivery station relative to said drum at which said transport is effected; means identifying the magazine container at said delivery station; a fixed delivery location in said item selector; means of identifying the position of a magazine within the item selector by the item which is located at the delivery location; means identifying the container for the magazine in which an item selected for recall is located; means identifying the magazine position to deliver the item selected for recall to said delivery location; logic comparison circuits for comparing the present and desired identifications and supplying directional signals; and means activated by said directional signals for effecting appropriate movements of said magazines, transport mechanism and storage drum to present the item selected for recall to said delivery location.

11. A storage and recall device for a plurality of items comprising: a rotary storage drum having a plurality of containers therearound; a plurality of magazines in said containers; a plurality of stored items in said magazines in identified positions therein; an item selector adjacent to said storage drum; mechanism for transporting a magazine between said storage drum and said item selector; a delivery station relative to said drum at which said transport is effected; means for identifying the magazine container at said delivery station; means identifying the magazine container in which an item selected for recall is located; logic means for effecting rotation of said storage drum to locate the magazine container for the magazine with the selected item at said delivery station; means for transporting the magazine with the selected item from its container to said item selector; means providing a fixed delivery location at the item selector; means positioning the magazine with the selected item in the delivery location; and means operating the item selector to deliver said desired item.

12. A storage and recall device for a plurality of items comprising: a rotary storage drum having a plurality of containers therearound; a plurality of magazines in said containers; a plurality of stored items in said magazines in identified positions therein; an item selector adjacent to said storage drum; mechanism for transporting a selected magazine between said storage drum and said item selector; a delivery station relative to said drum at which said transport is effected; a fixed delivery location at said item selector; means for reciprocating a magazine within said item selector so as to present a desired item at said delivery location; means identifying the magazine container at said delivery station; means identifying the container for the magazine in which an item selected for recall is located; means comparing said identifications and if unequal calling for rotation of the drum, said last mentioned means including means for activating said transport mechanism to replace a magazine in the item selector back in its drum container before the drum rotates to place the desired magazine container at the delivery station; means to thereafter reactivate said transport mechanism to deliver the desired magazine into the item selector; and means for operating said item selector to position the item selected for recall at said delivery location.

13. A storage and recall device for a plurality of items comprising: a rotary storage drum having a plurality of containers therearound; a plurality of magazines in said containers; a plurality of stored items in said magazines in identified positions therein; an item selector adjacent to said storage drum; mechanism for transporting a selected magazine between said storage drum and said item selector; a delivery station relative to said drum at which said transport is effected; a fixed delivery location at said item selector; means for reciprocating a magazine within said item selector so as to present an item selected for recall at said delivery location; means identifying the magazine container at said delivery station; means identifying the container for the magazine in which an item selected for recall is located; means comparing identifications and if unequal calling for rotation of the drum, said last mentioned means including means for activating said transport mechanism to replace a magazine in the item selector back in its drum container before the drum rotates to place the desired magazine container at the delivery station; means to thereafter reactivate said transport mechanism to deliver the desired magazine into the item selector; and means for operating said item selector to position the selected item at said delivery location, said last mentioned means including means identifying the position in the magazine at the delivery location, means identifying the position in the magazine desired to be located at the delivery location and means comparing the last mentioned identifications and stopping the magazine when these position identifications are equal.

14. A storage and recall device for a plurality of items comprising: a rotary storage drum having a plurality of containers therearound; a plurality of magazines in said containers; a plurality of stored items in said magazines in identified positions therein; an item selector adjacent to said storage drum; mechanism for transporting a selected magazine between said storage drum and said item selector; a delivery station relative to said drum at which said transport is effected; a fixed delivery location at said item selector; means for reciprocating a magazine within said item selector so as to present an item selected for recall at said delivery location; means identifying the magazine container at said delivery station; means identifying the container for the magazine in which an item selected for recall is located; means comparing identifications and if unequal calling for rotation of the drum, said last mentioned means including means for activating said transport mechanism to replace a magazine in the item selector back in its drum container before the drum rotates to place the desired magazine container at its delivery station; means to thereafter reactivate said transport mechanism to deliver the desired magazine into the item selector; and means for operating said item selector to position the selected item at said delivery location, said last mentioned means including means identifying the position in the magazine at the delivery location, means identifying the position in the magazine desired to be located at the delivery location and means comparing the last-mentioned identifications and stopping the magazine when these position identifications are equal, the comparison means for the drum container identifying means operating when said container identifications are equal to bypass said transport mechanism and call immediately for the comparison of the identifications of the positions in the magazines now and desired to be located at the delivery location within the item selector.

References Cited by the Examiner

UNITED STATES PATENTS

| | | | |
|---|---|---|---|
| 2,386,520 | 10/1945 | Watson et al. | 312—223 |
| 2,460,359 | 1/1949 | Page | 88—28 |
| 2,504,629 | 4/1950 | Bertello | 312—223 |
| 2,539,043 | 1/1951 | Verneaux | 340—146.2 |
| 2,575,745 | 11/1951 | Carlson | 129—16 X |
| 2,646,217 | 7/1953 | Law | 186—1.2 |
| 2,660,503 | 11/1953 | Bertello | 312—323 |
| 2,690,913 | 10/1954 | Rabinow | 340—174.1 |
| 2,705,181 | 3/1955 | Nye | 312—323 |
| 2,783,454 | 2/1957 | North | 340—149 |
| 2,785,388 | 3/1957 | McWhirter et al. | 340—149 |
| 2,872,053 | 2/1959 | Ulrich | 214—11 |
| 2,902,329 | 9/1959 | Brink et al. | 340—174.1 |
| 2,906,538 | 9/1959 | Rockola | 340—162 |
| 2,918,656 | 12/1959 | Nolde et al. | 340—162 |
| 2,922,424 | 1/1960 | Scott | 129—16.1 |
| 2,923,921 | 2/1960 | Shapin | 340—174 |
| 2,928,706 | 3/1960 | Abbott et al. | 318—467 X |
| 2,952,463 | 9/1960 | Vanderzee et al. | 340—162 |
| 2,984,821 | 5/1961 | Seigle | 340—146.2 |
| 3,011,151 | 11/1961 | Ketchledge | 340—146.2 |
| 3,045,529 | 7/1962 | Kuehnle | 88—1 |
| 3,062,997 | 11/1962 | Loyd | 318—467 |
| 3,149,529 | 10/1964 | Critchlow | 88—24 |

NEIL C. READ, *Primary Examiner.*

P. XIARHOS, *Assistant Examiner.*